(12) United States Patent
Shah et al.

(10) Patent No.: US 8,999,453 B2
(45) Date of Patent: Apr. 7, 2015

(54) CARBON NANOTUBE-INFUSED FIBER MATERIALS CONTAINING PARALLEL-ALIGNED CARBON NANOTUBES, METHODS FOR PRODUCTION THEREOF, AND COMPOSITE MATERIALS DERIVED THEREFROM

(75) Inventors: Tushar K. Shah, Columbia, MD (US); Harry C. Malecki, Abingdon, MD (US); Brandon K. Malet, Baltimore, MD (US); Robert D. Hoskins, Baltimore, MD (US); Jigar M. Patel, Perryville, MD (US)

(73) Assignee: Applied NanoStructured Solutions, LLC, Baltimore, MD (US)

( * ) Notice: Subject to any disclaimer, the term of this patent is extended or adjusted under 35 U.S.C. 154(b) by 290 days.

(21) Appl. No.: 13/019,248

(22) Filed: Feb. 1, 2011

(65) Prior Publication Data
US 2011/0186775 A1 Aug. 4, 2011

Related U.S. Application Data

(60) Provisional application No. 61/300,783, filed on Feb. 2, 2010.

(51) Int. Cl.
*D01F 9/12* (2006.01)
(52) U.S. Cl.
CPC .............. *D01F 9/12* (2013.01); *B05D 2256/00* (2013.01)
(58) Field of Classification Search
None
See application file for complete search history.

(56) References Cited

U.S. PATENT DOCUMENTS

| 2,412,707 | A | 12/1946 | Barnett |
| 3,304,855 | A | 2/1967 | Oebell |

(Continued)

FOREIGN PATENT DOCUMENTS

| CN | 1462767 A | 12/2003 |
| CN | 1592977 A | 3/2005 |

(Continued)

OTHER PUBLICATIONS

Vaccarini, et al., "Reinforcement of an epoxy resin by single walled nanotubes," AIP Conference Proceedings 2000, <http://dx.doi.org/10.1063/1.1342567>.

(Continued)

*Primary Examiner* — Timothy Meeks
*Assistant Examiner* — Michael P Rodriguez
(74) *Attorney, Agent, or Firm* — McDermott, Will & Emery LLP

(57) ABSTRACT

Carbon nanotube-infused fiber materials containing substantially parallel-aligned, infused carbon nanotubes are described herein. The carbon nanotube-infused fiber materials contain a fiber material and a layer of carbon nanotubes infused to the fiber material, where the infused carbon nanotubes are aligned substantially parallel to the longitudinal axis of the fiber material and at least a portion of the substantially parallel-aligned, infused carbon nanotubes are crosslinked to each other, to the fiber material, or both. Crosslinking can occur through covalent bonding or pi-stacking interactions, for example. The carbon nanotube-infused fiber materials can further contain additional carbon nanotubes that are grown on the layer of substantially parallel-aligned, infused carbon nanotubes. Composite materials containing the carbon nanotube-infused fiber materials and methods for production of the carbon nanotube-infused fiber materials are also described herein.

19 Claims, 6 Drawing Sheets

(56) References Cited

U.S. PATENT DOCUMENTS

| | | |
|---|---|---|
| 3,584,758 A | 6/1971 | Moore |
| 3,736,162 A | 5/1973 | Chvalovsky |
| 3,871,834 A | 3/1975 | Kuniya et al. |
| 4,104,083 A | 8/1978 | Hirano |
| 4,515,107 A | 5/1985 | Fournier et al. |
| 4,530,750 A | 7/1985 | Alsenberg et al. |
| 4,566,969 A | 1/1986 | Klein |
| 4,707,349 A | 11/1987 | Hjersted |
| 4,728,399 A | 3/1988 | Moehwald |
| 4,837,073 A | 6/1989 | McAllister et al. |
| 4,894,293 A | 1/1990 | Breit et al. |
| 4,920,917 A | 5/1990 | Nakatani et al. |
| 4,976,899 A | 12/1990 | Rousseau et al. |
| 5,038,561 A | 8/1991 | Chase |
| 5,093,155 A | 3/1992 | Miyazaki et al. |
| 5,130,194 A | 7/1992 | Baker et al. |
| 5,156,225 A | 10/1992 | Murrin |
| 5,173,367 A | 12/1992 | Liimatta et al. |
| 5,221,605 A | 6/1993 | Bard et al. |
| 5,223,353 A | 6/1993 | Ohsawa et al. |
| 5,225,265 A | 7/1993 | Prandy et al. |
| 5,227,238 A | 7/1993 | Hirai et al. |
| 5,238,808 A | 8/1993 | Bard et al. |
| 5,242,720 A | 9/1993 | Blake |
| 5,246,794 A | 9/1993 | Blomgren et al. |
| 5,310,687 A | 5/1994 | Bard et al. |
| 5,354,603 A | 10/1994 | Errede et al. |
| 5,370,921 A | 12/1994 | Cedarleaf |
| 5,470,408 A | 11/1995 | Nielson et al. |
| 5,514,217 A | 5/1996 | Niino et al. |
| 5,547,525 A | 8/1996 | Bennett et al. |
| 5,571,749 A | 11/1996 | Matsuda et al. |
| 5,639,984 A | 6/1997 | Nielson |
| 5,714,089 A | 2/1998 | Bard et al. |
| 5,731,147 A | 3/1998 | Bard et al. |
| 5,744,075 A | 4/1998 | Klett et al. |
| 5,908,585 A | 6/1999 | Shibuta |
| 5,968,274 A | 10/1999 | Fujioka et al. |
| 5,997,832 A | 12/1999 | Lieber et al. |
| 6,140,138 A | 10/2000 | Bard et al. |
| 6,146,783 A | 11/2000 | Brohm et al. |
| 6,184,280 B1 | 2/2001 | Shibuta |
| 6,205,943 B1 | 3/2001 | Lonno et al. |
| 6,221,154 B1 | 4/2001 | Lee et al. |
| 6,232,706 B1 | 5/2001 | Dai et al. |
| 6,251,520 B1 | 6/2001 | Blizzard et al. |
| 6,265,466 B1 | 7/2001 | Glatkowski et al. |
| 6,331,209 B1 | 12/2001 | Jang et al. |
| 6,333,016 B1 | 12/2001 | Resasco et al. |
| 6,361,861 B2 | 3/2002 | Gao |
| 6,382,120 B1 | 5/2002 | Keire |
| 6,413,487 B1 | 7/2002 | Resasco et al. |
| 6,420,293 B1 | 7/2002 | Chang et al. |
| 6,455,021 B1 | 9/2002 | Saito |
| 6,465,057 B1 | 10/2002 | Nakahigashi et al. |
| 6,479,028 B1 | 11/2002 | Kaner et al. |
| 6,479,030 B1 | 11/2002 | Firsich |
| 6,491,789 B2 | 12/2002 | Niu |
| 6,495,258 B1 | 12/2002 | Chen et al. |
| 6,528,572 B1 | 3/2003 | Patel et al. |
| 6,564,744 B2 | 5/2003 | Nakahigashi et al. |
| 6,641,793 B2 | 11/2003 | Haddon et al. |
| 6,653,619 B2 | 11/2003 | Chin et al. |
| 6,673,392 B2 | 1/2004 | Lee et al. |
| 6,692,717 B1 | 2/2004 | Smalley et al. |
| 6,699,525 B2 | 3/2004 | Jayatissa |
| 6,762,237 B2 | 7/2004 | Glatkowski et al. |
| 6,765,949 B2 | 7/2004 | Chang |
| 6,790,425 B1 | 9/2004 | Smalley et al. |
| 6,818,821 B2 | 11/2004 | Fujieda et al. |
| 6,837,928 B1 | 1/2005 | Zhang et al. |
| 6,852,410 B2 | 2/2005 | Veedu et al. |
| 6,863,942 B2 | 3/2005 | Ren et al. |
| 6,887,451 B2 | 5/2005 | Dodelet et al. |
| 6,900,264 B2 | 5/2005 | Kumar et al. |
| 6,900,580 B2 | 5/2005 | Dai et al. |
| 6,908,572 B1 | 6/2005 | Derbyshire et al. |
| 6,913,075 B1 | 7/2005 | Knowles et al. |
| 6,921,575 B2 | 7/2005 | Horiuchi et al. |
| 6,934,600 B2 | 8/2005 | Jang et al. |
| 6,936,653 B2 | 8/2005 | McElrath et al. |
| 6,955,800 B2 | 10/2005 | Resasco et al. |
| 6,962,892 B2 | 11/2005 | Resasco et al. |
| 6,967,013 B2 | 11/2005 | Someya et al. |
| 6,979,709 B2 | 12/2005 | Smalley et al. |
| 6,986,853 B2 | 1/2006 | Glatkowski et al. |
| 6,986,877 B2 | 1/2006 | Takikawa et al. |
| 6,994,907 B2 | 2/2006 | Resasco et al. |
| 7,011,760 B2 | 3/2006 | Wang et al. |
| 7,018,600 B2 | 3/2006 | Yanagisawa et al. |
| 7,022,776 B2 | 4/2006 | Bastiaens et al. |
| 7,045,108 B2 | 5/2006 | Jiang et al. |
| 7,056,452 B2 | 6/2006 | Niu et al. |
| 7,074,294 B2 | 7/2006 | Dubrow |
| 7,094,386 B2 | 8/2006 | Resasco et al. |
| 7,105,596 B2 | 9/2006 | Smalley et al. |
| 7,108,841 B2 | 9/2006 | Smalley et al. |
| 7,118,693 B2 | 10/2006 | Glatkowski et al. |
| 7,125,502 B2 | 10/2006 | Smalley et al. |
| 7,125,534 B1 | 10/2006 | Smalley et al. |
| 7,132,621 B2 | 11/2006 | Kumar et al. |
| 7,144,563 B2 | 12/2006 | Rao et al. |
| 7,148,619 B2 | 12/2006 | Ken et al. |
| 7,151,129 B2 | 12/2006 | Ishikawa et al. |
| 7,153,452 B2 | 12/2006 | Ogale et al. |
| 7,157,068 B2 | 1/2007 | Li et al. |
| 7,160,532 B2 | 1/2007 | Liu et al. |
| 7,211,320 B1 | 5/2007 | Cooper et al. |
| 7,226,643 B2 | 6/2007 | Juang et al. |
| 7,235,159 B2 | 6/2007 | Gu et al. |
| 7,253,442 B2 | 8/2007 | Huang et al. |
| 7,261,779 B2 | 8/2007 | Gardner |
| 7,265,174 B2 | 9/2007 | Carroll et al. |
| 7,265,175 B2 | 9/2007 | Winey et al. |
| 7,278,324 B2 | 10/2007 | Smits et al. |
| 7,285,591 B2 | 10/2007 | Winey et al. |
| 7,294,302 B2 | 11/2007 | Kolde et al. |
| 7,329,698 B2 | 2/2008 | Noguchi et al. |
| 7,338,684 B1 | 3/2008 | Curliss et al. |
| 7,354,881 B2 | 4/2008 | Resasco et al. |
| 7,354,988 B2 | 4/2008 | Charati et al. |
| 7,372,880 B2 | 5/2008 | Jablonski et al. |
| 7,378,075 B2 | 5/2008 | Someya et al. |
| 7,384,663 B2 | 6/2008 | Olry et al. |
| 7,399,794 B2 | 7/2008 | Harmon et al. |
| 7,407,640 B2 | 8/2008 | Barrera et al. |
| 7,407,901 B2 | 8/2008 | Bystricky et al. |
| 7,410,628 B2 | 8/2008 | Bening et al. |
| 7,411,019 B1 | 8/2008 | Bley |
| 7,419,601 B2 | 9/2008 | Cooper et al. |
| 7,431,965 B2 | 10/2008 | Grigorian et al. |
| 7,442,284 B2 | 10/2008 | Ren et al. |
| 7,445,817 B2 | 11/2008 | Kumar et al. |
| 7,448,441 B2 | 11/2008 | Hendricks et al. |
| 7,448,931 B2 | 11/2008 | Liu et al. |
| 7,459,627 B2 | 12/2008 | Lee et al. |
| 7,465,605 B2 | 12/2008 | Raravikar et al. |
| 7,473,466 B1 | 1/2009 | Muradov |
| 7,479,052 B2 | 1/2009 | Kim et al. |
| 7,488,455 B2 | 2/2009 | Dai et al. |
| 7,504,078 B1 | 3/2009 | Jacques et al. |
| 7,510,695 B2 | 3/2009 | Smalley et al. |
| 7,534,486 B2 | 5/2009 | Boerstoel et al. |
| 7,544,415 B2 | 6/2009 | Chen et al. |
| 7,563,411 B2 | 7/2009 | Jiang et al. |
| 7,563,428 B2 | 7/2009 | Resasco et al. |
| 7,569,425 B2 | 8/2009 | Huang et al. |
| 7,588,700 B2 | 9/2009 | Kwon et al. |
| 7,592,248 B2 | 9/2009 | Ventzek et al. |
| 7,597,869 B2 | 10/2009 | Hsiao |
| 7,608,798 B2 | 10/2009 | Kumar et al. |
| 7,611,579 B2 | 11/2009 | Lashmore et al. |
| 7,615,204 B2 | 11/2009 | Ajayan et al. |
| 7,615,205 B2 | 11/2009 | Jiang et al. |

(56) References Cited

U.S. PATENT DOCUMENTS

| | | |
|---|---|---|
| 7,632,550 B2 | 12/2009 | Mizuno et al. |
| 7,632,569 B2 | 12/2009 | Smalley et al. |
| 7,700,943 B2 | 4/2010 | Raravikar et al. |
| 7,709,087 B2 | 5/2010 | Majidi et al. |
| 7,718,220 B2 | 5/2010 | D'Silva et al. |
| 7,729,100 B2 | 6/2010 | Llorente Gonzalez et al. |
| 7,771,289 B2 | 8/2010 | Palumbo et al. |
| 7,771,798 B1 | 8/2010 | Grosse et al. |
| 7,776,777 B2 | 8/2010 | Kim et al. |
| 7,811,632 B2 | 10/2010 | Eres |
| 7,815,820 B2 | 10/2010 | Tan et al. |
| 7,816,709 B2 | 10/2010 | Balzano et al. |
| 7,862,795 B2 | 1/2011 | Zhang et al. |
| 7,867,468 B1 | 1/2011 | Haddon et al. |
| 7,867,616 B2 | 1/2011 | Harutyunyan |
| 7,871,591 B2 | 1/2011 | Harutyunyan et al. |
| 7,880,376 B2 | 2/2011 | Takai et al. |
| 7,927,701 B2 | 4/2011 | Curliss et al. |
| 8,048,490 B2 | 11/2011 | Watanabe et al. |
| 2001/0017219 A1 | 8/2001 | Kikuchi et al. |
| 2002/0022179 A1 | 2/2002 | Yuasa et al. |
| 2002/0028112 A1 | 3/2002 | Paulshus et al. |
| 2002/0035170 A1 | 3/2002 | Glatkowski et al. |
| 2002/0085968 A1 | 7/2002 | Smalley et al. |
| 2002/0090331 A1 | 7/2002 | Smalley et al. |
| 2002/0150684 A1 | 10/2002 | Jayatissa |
| 2003/0004058 A1 | 1/2003 | Li et al. |
| 2003/0024884 A1 | 2/2003 | Petrik |
| 2003/0042147 A1 | 3/2003 | Talin et al. |
| 2003/0044678 A1 | 3/2003 | ESq. |
| 2003/0068432 A1 | 4/2003 | Dai et al. |
| 2003/0094734 A1 | 5/2003 | Deckard et al. |
| 2003/0102585 A1 | 6/2003 | Poulin et al. |
| 2003/0111333 A1 | 6/2003 | Montgomery et al. |
| 2003/0122111 A1 | 7/2003 | Glatkowski |
| 2003/0124287 A1 | 7/2003 | Grosskrueger et al. |
| 2003/0143453 A1 | 7/2003 | Ren et al. |
| 2003/0166744 A1 | 9/2003 | Van Dijk et al. |
| 2003/0211029 A1 | 11/2003 | Someya et al. |
| 2003/0213939 A1 | 11/2003 | Narayan et al. |
| 2004/0007955 A1 | 1/2004 | Yaniv et al. |
| 2004/0026234 A1 | 2/2004 | Vanden Brande et al. |
| 2004/0032698 A1 | 2/2004 | Paul et al. |
| 2004/0071870 A1 | 4/2004 | Knowles et al. |
| 2004/0082247 A1 | 4/2004 | Desai et al. |
| 2004/0105807 A1 | 6/2004 | Fan et al. |
| 2004/0171725 A1 | 9/2004 | Richardson et al. |
| 2004/0184981 A1 | 9/2004 | Liu et al. |
| 2004/0245088 A1 | 12/2004 | Gardner |
| 2004/0253167 A1 | 12/2004 | Silva et al. |
| 2005/0023727 A1 | 2/2005 | Sampson |
| 2005/0042163 A1 | 2/2005 | Allison et al. |
| 2005/0049355 A1 | 3/2005 | Tang et al. |
| 2005/0062024 A1 | 3/2005 | Bessette et al. |
| 2005/0081752 A1 | 4/2005 | Snyder et al. |
| 2005/0090024 A1 | 4/2005 | Chopra |
| 2005/0090176 A1 | 4/2005 | Dean et al. |
| 2005/0095938 A1 | 5/2005 | Rosenberger et al. |
| 2005/0100501 A1 | 5/2005 | Veedu et al. |
| 2005/0112052 A1 | 5/2005 | Gu et al. |
| 2005/0119371 A1 | 6/2005 | Drzal et al. |
| 2005/0172370 A1 | 8/2005 | Haq et al. |
| 2005/0176329 A1 | 8/2005 | Olry et al. |
| 2005/0181209 A1 | 8/2005 | Karandikar |
| 2005/0188727 A1 | 9/2005 | Greywall |
| 2005/0202315 A1 | 9/2005 | Sugeno et al. |
| 2005/0204984 A1 | 9/2005 | Finot |
| 2005/0230560 A1 | 10/2005 | Glatkowski et al. |
| 2005/0260120 A1 | 11/2005 | Smalley et al. |
| 2005/0260412 A1 | 11/2005 | Gardner |
| 2005/0263456 A1 | 12/2005 | Cooper et al. |
| 2005/0284232 A1 | 12/2005 | Rice |
| 2005/0287064 A1 | 12/2005 | Mayne et al. |
| 2006/0002841 A1* | 1/2006 | Chen et al. ............... 423/447.1 |
| 2006/0047052 A1 | 3/2006 | Barrera et al. |
| 2006/0052509 A1 | 3/2006 | Saitoh |
| 2006/0057361 A1 | 3/2006 | Ounaies et al. |
| 2006/0060825 A1 | 3/2006 | Glatkowski |
| 2006/0065546 A1 | 3/2006 | Curodeau |
| 2006/0078705 A1 | 4/2006 | Glatkowski et al. |
| 2006/0099135 A1 | 5/2006 | Yodh et al. |
| 2006/0110599 A1 | 5/2006 | Honma et al. |
| 2006/0118158 A1 | 6/2006 | Zhang et al. |
| 2006/0121275 A1 | 6/2006 | Poulin et al. |
| 2006/0135677 A1 | 6/2006 | Huang et al. |
| 2006/0159916 A1 | 7/2006 | Dubrow et al. |
| 2006/0166003 A1 | 7/2006 | Khabashesku et al. |
| 2006/0177602 A1 | 8/2006 | Dijon et al. |
| 2006/0198956 A1 | 9/2006 | Eres |
| 2006/0202168 A1 | 9/2006 | Barrera et al. |
| 2007/0003817 A1 | 1/2007 | Umeda et al. |
| 2007/0020167 A1 | 1/2007 | Han et al. |
| 2007/0048521 A1 | 3/2007 | Istvan |
| 2007/0054105 A1 | 3/2007 | Hsiao |
| 2007/0087198 A1 | 4/2007 | Dry |
| 2007/0092431 A1 | 4/2007 | Resasco et al. |
| 2007/0110977 A1 | 5/2007 | Al-Haik et al. |
| 2007/0128960 A1 | 6/2007 | Ghasemi Nejhad et al. |
| 2007/0135588 A1 | 6/2007 | Diakoumakos et al. |
| 2007/0153362 A1 | 7/2007 | Gruner |
| 2007/0189953 A1 | 8/2007 | Bai et al. |
| 2007/0231156 A1 | 10/2007 | Hong |
| 2007/0259128 A1 | 11/2007 | Parsapour |
| 2007/0265379 A1 | 11/2007 | Chen et al. |
| 2008/0014431 A1 | 1/2008 | Lashmore et al. |
| 2008/0020193 A1* | 1/2008 | Jang et al. ............... 428/292.1 |
| 2008/0025906 A1 | 1/2008 | Lin et al. |
| 2008/0039557 A1 | 2/2008 | Li et al. |
| 2008/0048364 A1 | 2/2008 | Armenlades et al. |
| 2008/0053922 A1 | 3/2008 | Honsinger, Jr. et al. |
| 2008/0063585 A1 | 3/2008 | Smalley et al. |
| 2008/0073098 A1 | 3/2008 | Llorente Gonzalez et al. |
| 2008/0075954 A1 | 3/2008 | Wardle et al. |
| 2008/0115913 A1 | 5/2008 | Henderson et al. |
| 2008/0118753 A1 | 5/2008 | Poulin et al. |
| 2008/0137890 A1 | 6/2008 | Petersen et al. |
| 2008/0145528 A1 | 6/2008 | Deng et al. |
| 2008/0155888 A1 | 7/2008 | Vick et al. |
| 2008/0160286 A1 | 7/2008 | Asrar et al. |
| 2008/0163976 A1 | 7/2008 | Lalande et al. |
| 2008/0170982 A1 | 7/2008 | Zhang et al. |
| 2008/0173111 A1 | 7/2008 | Thostenson et al. |
| 2008/0176058 A1 | 7/2008 | Maschmann et al. |
| 2008/0176987 A1 | 7/2008 | Trever et al. |
| 2008/0182108 A1 | 7/2008 | Curliss et al. |
| 2008/0187648 A1 | 8/2008 | Hart et al. |
| 2008/0237922 A1 | 10/2008 | Vaidyanathan et al. |
| 2008/0247938 A1 | 10/2008 | Tsai et al. |
| 2008/0248275 A1 | 10/2008 | Jang et al. |
| 2008/0279753 A1 | 11/2008 | Harutyunyan |
| 2008/0286546 A1 | 11/2008 | Lashmore et al. |
| 2008/0286564 A1 | 11/2008 | Tsotsis |
| 2008/0311301 A1 | 12/2008 | Diss et al. |
| 2009/0004480 A1 | 1/2009 | Dufresne et al. |
| 2009/0017301 A1 | 1/2009 | Moireau |
| 2009/0020734 A1 | 1/2009 | Jang et al. |
| 2009/0047453 A1 | 2/2009 | Folaron et al. |
| 2009/0047502 A1 | 2/2009 | Folaron et al. |
| 2009/0068387 A1 | 3/2009 | Panzer et al. |
| 2009/0068461 A1 | 3/2009 | Reneker et al. |
| 2009/0072222 A1 | 3/2009 | Radisic et al. |
| 2009/0081383 A1 | 3/2009 | Alberding et al. |
| 2009/0081441 A1 | 3/2009 | Shah et al. |
| 2009/0088582 A1* | 4/2009 | Inagaki et al. ............... 556/143 |
| 2009/0092832 A1 | 4/2009 | Moireau |
| 2009/0099016 A1 | 4/2009 | Carruthers et al. |
| 2009/0099276 A1 | 4/2009 | Barrera et al. |
| 2009/0117363 A1 | 5/2009 | Wardle et al. |
| 2009/0121219 A1 | 5/2009 | Song et al. |
| 2009/0121727 A1 | 5/2009 | Lynch et al. |
| 2009/0126783 A1 | 5/2009 | Lin et al. |
| 2009/0130530 A1 | 5/2009 | Tanaka |
| 2009/0136707 A1 | 5/2009 | Ueno |
| 2009/0140098 A1 | 6/2009 | Lengsfeld et al. |

(56) References Cited

U.S. PATENT DOCUMENTS

| | | |
|---|---|---|
| 2009/0176100 A1 | 7/2009 | Higashi et al. |
| 2009/0176112 A1 | 7/2009 | Kruckenberg et al. |
| 2009/0186214 A1 | 7/2009 | Lafdi et al. |
| 2009/0191352 A1 | 7/2009 | DuFaux et al. |
| 2009/0192241 A1 | 7/2009 | Raravikar et al. |
| 2009/0212430 A1 | 8/2009 | Wyland |
| 2009/0214800 A1 | 8/2009 | Saito |
| 2009/0220409 A1 | 9/2009 | Curliss et al. |
| 2009/0227162 A1 | 9/2009 | Kruckenberg et al. |
| 2009/0258164 A1 | 10/2009 | Nakai et al. |
| 2009/0277897 A1 | 11/2009 | Lashmore et al. |
| 2009/0282802 A1 | 11/2009 | Cooper et al. |
| 2009/0286079 A1 | 11/2009 | Barker et al. |
| 2009/0294753 A1* | 12/2009 | Hauge et al. .................... 257/9 |
| 2009/0311166 A1 | 12/2009 | Hart et al. |
| 2010/0000770 A1 | 1/2010 | Gupta et al. |
| 2010/0059243 A1 | 3/2010 | Chang |
| 2010/0074834 A1 | 3/2010 | Kim |
| 2010/0087042 A1 | 4/2010 | Kim et al. |
| 2010/0098931 A1 | 4/2010 | Daniel et al. |
| 2010/0099319 A1 | 4/2010 | Lashmore et al. |
| 2010/0112373 A1 | 5/2010 | Coffey et al. |
| 2010/0143701 A1 | 6/2010 | Zhu et al. |
| 2010/0159240 A1 | 6/2010 | Shah et al. |
| 2010/0178825 A1 | 7/2010 | Shah et al. |
| 2010/0188833 A1 | 7/2010 | Liang et al. |
| 2010/0192851 A1 | 8/2010 | Shah et al. |
| 2010/0196697 A1 | 8/2010 | D'Silva et al. |
| 2010/0197848 A1 | 8/2010 | Verghese et al. |
| 2010/0203328 A1 | 8/2010 | Hochstetter et al. |
| 2010/0206504 A1 | 8/2010 | Akiyama et al. |
| 2010/0210159 A1 | 8/2010 | Zhu |
| 2010/0221424 A1 | 9/2010 | Malecki et al. |
| 2010/0224129 A1 | 9/2010 | Malecki et al. |
| 2010/0227134 A1 | 9/2010 | Shah et al. |
| 2010/0247990 A1 | 9/2010 | Ugaji et al. |
| 2010/0254885 A1 | 10/2010 | Menchhofer et al. |
| 2010/0272891 A1 | 10/2010 | Malecki et al. |
| 2010/0276072 A1 | 11/2010 | Shah et al. |
| 2010/0279569 A1 | 11/2010 | Shah et al. |
| 2010/0311866 A1 | 12/2010 | Huang et al. |
| 2011/0017867 A1 | 1/2011 | Simmons et al. |
| 2011/0024409 A1 | 2/2011 | Shah et al. |
| 2011/0024694 A1 | 2/2011 | Shah et al. |
| 2011/0040007 A1 | 2/2011 | Chandrasekhar et al. |
| 2011/0068514 A1 | 3/2011 | Ruiz et al. |
| 2011/0089958 A1 | 4/2011 | Malecki et al. |
| 2011/0123735 A1 | 5/2011 | Shah et al. |
| 2011/0124483 A1 | 5/2011 | Shah et al. |
| 2011/0174519 A1 | 7/2011 | Shah et al. |
| 2011/0186775 A1 | 8/2011 | Shah et al. |
| 2011/0297892 A1 | 12/2011 | Shah et al. |
| 2012/0000691 A1 | 1/2012 | Shah et al. |

FOREIGN PATENT DOCUMENTS

| | | |
|---|---|---|
| CN | 1641905 A | 7/2005 |
| CN | 1694981 A | 11/2005 |
| CN | 1730555 A | 2/2006 |
| CN | 1796334 A | 7/2006 |
| CN | 1290764 C | 12/2006 |
| CN | 101698975 | 4/2008 |
| CN | 101173386 A | 5/2008 |
| CN | 101230145 A | 7/2008 |
| CN | 10128442 A | 10/2008 |
| CN | 101316806 A | 12/2008 |
| CN | 101365740 A | 2/2009 |
| CN | 101418886 A | 4/2009 |
| CN | 101437663 A | 5/2009 |
| CN | 201241910 Y | 5/2009 |
| CN | 101484628 A | 7/2009 |
| CN | 101565893 A | 10/2009 |
| CN | 101582302 A | 11/2009 |
| EP | 1450422 | 8/2004 |
| GB | 2294666 A | 5/1996 |
| IN | 01900DE2008 A | 3/2010 |
| JP | 49-018891 | 5/1974 |
| JP | S 58-45923 | 3/1983 |
| JP | 62-007668 | 1/1987 |
| JP | 63-242537 | 10/1988 |
| JP | 04-149068 | 5/1992 |
| JP | 04-300247 | 10/1992 |
| JP | 05-306167 | 11/1993 |
| JP | 07-165927 | 6/1995 |
| JP | 09-039125 | 2/1997 |
| JP | 10-265870 | 10/1998 |
| JP | 11-343177 | 12/1999 |
| JP | 2002-140979 A | 5/2002 |
| JP | 2002-370695 A | 12/2002 |
| JP | 2003-517541 A | 5/2003 |
| JP | 2004-143019 A | 5/2004 |
| JP | 2005-517788 A | 6/2005 |
| JP | 2005-219950 A | 8/2005 |
| JP | 2005-538026 A | 12/2005 |
| JP | 2006-057129 A | 3/2006 |
| JP | 2006-527786 A | 12/2006 |
| JP | 2007-502246 A | 2/2007 |
| JP | 2007-119318 A | 5/2007 |
| JP | 2007-523033 A | 8/2007 |
| JP | 2007-314421 A | 12/2007 |
| JP | 2008-068330 A | 3/2008 |
| JP | 2009-013327 A | 1/2009 |
| JP | 2009-057249 A | 3/2009 |
| JP | 2009-517531 A | 4/2009 |
| JP | 2009-535530 A | 10/2009 |
| JP | 2009-537339 A | 10/2009 |
| JP | 2011-512315 A | 4/2011 |
| KR | 100829001 | 5/2008 |
| TW | 200833861 | 8/2008 |
| WO | WO-98/55288 A1 | 12/1998 |
| WO | WO-03/078832 | 9/2003 |
| WO | WO 03/082733 | 10/2003 |
| WO | WO2005/005554 | 1/2005 |
| WO | WO-2005/05554 A2 | 1/2005 |
| WO | WO 2005/075341 | 8/2005 |
| WO | WO 2006/048531 | 5/2006 |
| WO | WO/2006/048531 A1 | 5/2006 |
| WO | WO-2006/082829 A1 | 8/2006 |
| WO | WO/2006/115486 A1 | 11/2006 |
| WO | WO 2007/015710 | 2/2007 |
| WO | WO/2007/061854 A2 | 5/2007 |
| WO | WO 2007/063764 | 6/2007 |
| WO | WO/2007/089118 A1 | 8/2007 |
| WO | WO-2007/130979 A2 | 11/2007 |
| WO | WO 2007136755 A2 * | 11/2007 |
| WO | WO/2007/149109 A2 | 12/2007 |
| WO | WO/2008/041183 A2 | 4/2008 |
| WO | WO/2008/054541 A2 | 5/2008 |
| WO | WO-2008/068042 A2 | 6/2008 |
| WO | WO-2008/654446 | 6/2008 |
| WO | WO 2008/085634 | 7/2008 |
| WO | WO/2008/085634 A1 | 7/2008 |
| WO | WO-2008085550 A2 | 7/2008 |
| WO | WO/2008/115640 A2 | 9/2008 |
| WO | WO-2008/115913 A2 | 9/2008 |
| WO | WO-2008/133299 A1 | 11/2008 |
| WO | WO/2009/004346 A1 | 1/2009 |
| WO | WO-2009/007617 A2 | 1/2009 |
| WO | WO-2009/080048 A2 | 7/2009 |
| WO | WO 2009/103925 | 8/2009 |
| WO | WO 2009110885 | 9/2009 |
| WO | WO 2009/124862 | 10/2009 |
| WO | WO-2010/006807 A2 | 1/2010 |
| WO | WO-2011/053457 | 5/2011 |

OTHER PUBLICATIONS

Ago, et al., "Colloidal Solution of Metal Nanoparticles as a Catalyst for Carbon Nanotube Growth", Proceedings Materials Research Society, Fall 2000, pp. A13.18.1-A13.18.5, vol. 633, Materials Research Society.

Bradford, et al., "Electrical Conductivity Study of Carbon nanotube Yarns, 3-D Hybrid Braids and their Composites", Jouranl of Com-

(56) References Cited

OTHER PUBLICATIONS posite Materials, pp. 1533-1545, vol. 42, No. 15, SAGE Productions, Los Angeles, London, New Delhi and Singapore.

Bubert, et al., "Basic analytical investigation of plasma-chemically modified carbon fibers", Spectrochimica Acta Part B., 2002, pp. 1601-1610, vol. 57, Elsevier Science B.V.

Chae, et al., "A comparison of reinforcement efficiency of various types of carbon nanotubes in polyacrylonitrile fiber", Polymer, Nov. 21, 2005, pp. 10925-10935, vol. 46, No. 24, Elsevier Ltd.

Che, et al., "Chemical Vapor Deposition Based Synthesis of Carbon Nanotubes and Nanofibers Using a Template Method", Chem. Mater., 1998, pp. 260-267, vol. 10, American Chemical Society.

Chen, et al., "Basalt fiber-epoxy laminates with functionalized multi-walled carbon nanotubes", Composites, Part A, 2009, pp. 1082-1089, vol. 40, Elsevier Ltd.

Chen, et al., "Pulsed electrodeposition of Pt nanoclusters on carbon nanotubes modified carbon materials using diffusion restricting viscous electroyles", Electrochemistry Communications, Jun. 2007, pp. 1348-1354, vol. 9, Elsevier B.V.

Ci, et al., "Direct Growth of Carbon Nanotubes on the Surface of Ceramic Fibers", Carbon, 2005, pp. 883-886, vol. 43, No. 4, Elsevier Ltd.

Franz, et al., "Carbon Single-Wall Nanotube Growth in a Volumetrically Confined Arc Discharge System", U.S. Departement of Energy Journal of Undergraduate Research, pp. 66-69, publication date unknown.

Garcia, et al., "Aligned Carbon Nanotube Reinforcement of Advanced Composite Ply Interfaces," 49th AIAA/ASCE/AHS/ASC Structures, Structural Dynamics, and Materials Conference, Apr. 7-10 2008, Schaumburg, IL, MIT, American Institute of Aeronautics and Astronautics, Inc.

Hsu, et al., "Optical Absorption and Thermal Transport of Individual Suspended Carbon Nanotube Bundles", Nano Lett., 2009, pp. 590-594, vol. 9, No. 2, American Chemical Society, Publication Date (Web): Jan. 13, 2009.

Jiang, et al., "Carbon nanotube-coated solid-phase microextraction metal fiber based on sol-gel technique", Journal of Chromatography A., May 29, 2009, pp. 4641-4647, vol. 1216, Elsevier B.V.

Jiang, et al., "Plasma-Enhanced Deposition of Silver Nanoparticles onto Polymer and Metal Surfaces for the Generation of Antimicrobial Characteristics", Journal of Applied Polymer Science, 2004, pp. 1411-1422, vol. 93, Wiley Periodicals, Inc.

Jung, et al., "Fabrication of radar absorbing structure (RAS) using GFR-nano composite and spring-back compensation of hybrid composite RAS shells", Composite Structures, 2006, pp. 571-576, vol. 75, Elsevier Ltd.

Kim, et al., "Processing, characterization, and modeling of carbon nanotube-reinforced multiscale composites," Composites Science and Technology, 2009, pp. 335,342, vol. 69, Elsevier Ltd.

Kind, et al., "Patterned Films of Nanotubes Using Microcontact Printing of Catalysts", Adv. Mater., 1999, pp. 1285-1289, vol. 11, No. 15, WILEY-VCH Verlag GmbH, D-69469 Weinheim.

Laachachi, et al., "A chemical method to graft carbon nanotubes onto a carbon fiber", Materials Letters, 2008, pp. 394-397, vol. 62, Elsevier B.V.

Lee, "Syntheses and properties of fluorinated carbon materials", Journal of Fluorine Chemistry, 2007, pp. 392-403, vol. 128, Elsevier B.V.

Lee, et al., "Fabrication and design of multi-layered radar absorbing structures of MWNT-filled glass/epoxy plain-weave composites", Composite Structures, 2006, pp. 397-405, vol. 76, Elsevier Ltd.

Li, et al., "A Miniature glucose/$O_2$ biofuel cell with single-walled carbon nanotubes-modified carbon fiber microelectrodes as the substrate", Electrochemistry Communications, Jun. 2008, pp. 851-854, vol. 10, Elsevier B.V.

Li, et al., "Electromagnetic Interference (EMI) Shielding of Single-Walled Carbon Nanotube Epoxy Composites", Nano Lett., 2006, pp. 1141-1145, vol. 6, No. 6, American Chemical Society.

Makris, et al., "Carbon Nanotubes Growth and Anchorage to Carbon Fibres", Carbon Nanotubes, 2006, pp. 57-58, vol. 222, Springer, the Netherlands.

Meyyappan, et al., "Carbon nanotube growth by PECVD: a review", Plasma Sources Sci. Technol., 2003, pp. 205-216, vol. 12, IOP Publishing Ltd, UK.

Mylvaganam, "Fabrication and Application of Polymer Composites Comprising Carbon Nanotubes", Recent Pat Nanotechnol., 2007, pp. 59-65, vol. 1, Bentham Science Publishers, Ltd.

Panhuis, et al., "Carbon Nanotube Mediated Reduction in Optical Activity in Polyaniline Composite Materials", J. Phys. Chem. C, 2008, pp. 1441-1445, vol. 112, American Chemical Society.

Pisco, et al., "Hollow fibers integrated with single walled carbon nanotubes: Bandgap modification and chemical sensing capability", Sensors and Actuators B, 2008, pp. 163-170, vol. 129, Elsevier B.V.

Račkauskas "Carbon nanotube growth and use in energy sector", Energetika, 2006, pp. 43-46, vol. 2.

Satishkumar, et al., "Bundles of aligned carbon nanotubes obtained by the pyrolysis of ferrocene-hydrocarbon mixtures: role of the metal nanoparticles produced in situ", Chemical Physics Letters, 1999, pp. 158-162, vol. 307, Elsevier Science B.V.

Suh, et al., "Highly ordered two-dimensional carbon nanotube arrays", Applied Physics Letters, Oct. 4, 2002, pp. 2047-2049, vol. 75, No. 14, American Institute of Physics.

Thostenson, et al., "Carbon nanotube/carbon fiber hybrid multiscale composites", J. Appl. Phys., 2002, pp. 6034-6037, vol. 91, No. 9, American Institute of Physics.

Wang, et al., "Penetration depth of atmospheric pressure plasma surface modification into multiple layers of polyester fabrics", Surface and Coatings Technology, 2007, pp. 77-83, vol. 202, Elsevier B.V.

Wichmann, et al., "Glass-fibre-reinforced composites with enhanced mechanical and electrical properties—Benefits and limitations of a nanoparticle modified matrix", Engineering Fracture Mechanics, 2006, pp. 2346-2359, vol. 73, Eliasevier Ltd.

Xu, et al., "Bone-Shaped Nanomaterials for Nanocomposite Applications", Nano Lett., 2003, pp. 1135-1139, vol. 3, No. 8, American Chemical Society.

Yabe, et al., Synthesis of well-aligned carbon nanotubes by radio frequency plasma enhanced CVD method, Diamond and Related Materials, 2004, pp. 1292-1295, vol. 13, Elsevier B.V.

Yanagishita, et al., "Carbon Nanotubes with a Triangular Cross-section, Fabricated Using Anodic Porous Alumina as the Temple", Adv. Mater., 204, pp. 429-432, vol. 16, No. 5, WILEY-VCH Verlag GmbH & Co. KGaA, Weinheim.

Yang, et al., "Electrical Conductivity and Electromagnetic Interference Shielding of Multi-walled Carbon Nanotube Filled Polymer Composites" Mater. Res. Soc. Symp. Proc., 2005, pp. HH5.3.1-HH.5.3.5, vol. 858E, Materials Research Society.

Yeh, et al., "Mechanical properties of phenolic-based nanocomposites reinforced by multi-walled carbon nanotubes and carbon fibers", Composites: Part A, 2008, pp. 677-684, vol. 39, No. 4.

Zhang, et al., "In situ growth of carbon nanotubes on inorganic fibers with different surface properties," Materials Chemistry and Physics, 2008, pp. 317-321, vol. 107, Science Direct.

Zhao, et al., "Growth of carbon nanotubes on the surface of carbon fibers", Carbon, 2007, pp. 380-383, vol. 46, No. 2, Elsevier Ltd.

Zhao, et al., "The growth of multi-walled carbon nanotubes with different morphologies on carbon fibers", Carbon, 2005, pp. 651-673, vol. 43, Elsevier Ltd.

Zhu, et al., "Carbon nanotube growth on carbon fibers", Diamond and Related Materials, 2003, pp. 1825-1825, vol. 12, Elsevier B.V.

Zhu, et al., "Synthesis of single-walled carbon nanotubes by the vertical floating catalyst method," Chinese Science Bulletin, 2002, pp. 159-162, vol. 47, No. 2.

U.S. Appl. No. 12/766,817, filed Apr. 23, 2010, Tushar K. Shah.

U.S. Appl. No. 61/295,621, filed Jan. 15, 2010, Harry C. Malecki.

U.S. Appl. No. 61/297,704, filed Jan. 22, 2010, Tushar K. Shah.

Kramer, et al., Constrained Iron Catalysts for Single-Walled Carbon Nanotube Growth?, Langmuir 2005, 21, 8466-8470 [http://pubs.acs.org/doi/abs/10.1021/la0506729].

Lux, "PCT Application No. PCT/US2007/086875 Search Report and Written Opinion", May 13, 2008.

(56) References Cited

OTHER PUBLICATIONS

Vaccarini et al., "Reinforcement of an Epoxy Resin by Single Walled Nanotubes", AIP Conference Proceedings, Nov. 21, 2000, vol. 544, pp. 521-525.

Wang et al., "Processing and Property Investigation of Single-Walled Carbon Nanotube ISWNT) Buckypapaper/Epoxy Resin Matrix Nanocomposit", Composites Part A: Applied Science and Manufacturing, Oct. 1, 2004, pp. 1225-1232. Publisher: PCT/ Published in : PCT.

Zhang et al., "Integration and characterization of aligned carbon nanotubes on metal/silicon substrates and effects of water", Applied Surface Science 255 (2009) 5003-5008, entire document.

Qu, et al., "Carbon Microfibers Sheathed with Aligned Carbon Nanotubes: Towards Multidimensional, Multicomponent, and Multifunctional Nanomaterials, " Small, Aug. 2006, pp. 1052-1059, vol. 2, No. 8-9.

Yamamoto, et al., "High-yield growth and morphology control of aligned carbon nanotubes on ceramic fibers for multifunctional enhancement of structural composites," Carbon, Mar. 2009, pp. 551-560, vol. 47, No. 3.

Veedu, et al., "Multifunctional composites using reinforced laminae with carbon-nanotube forests," Nature Materials, Jun. 2006, pp. 457-462, vol. 5.

Database WPI, Week 200902, Thompson Scientific London, GB, AN 2009-A40289 & KR 100 829 001 B1 (Korea Inst Energy Res) May 14, 2008, abstract.

Meyyappan, Carbon Nanotubes: Science and Applications, Jul. 31, 2007.

Thostenson, et al., "Carbon Nanotube Networks: Sensing of Distributed Strain and Damage for Life Prediction and Self Healing," Advanced Materials, Nov. 2006, pp. 2837-2841, vol. 18, No. 21.

Gou, et al., "Carbon nanofiber paper for lightning strike protection of composite materials," Composites Part B, Jul. 2009, p. 192-198, vol. 41, No. 2.

Fiedler, et al., "Can Carbon Nanotubes be Used to Sense Damage in Composites?," Ann Chim Sci Mat, Jan. 2004, pp. 81-94, vol. 29, No. 6.

Garcia, et al., "Fabrication and multifunctional properties of a hybrid laminate with aligned carbon nanotubes grown in situ," Composites Science and Technology, Jul. 2008, vol. 68, No. 9.

Database WPI, Week 200902, Thomson Scientific, London, May 14, 2008 Abstract XP-002728955.

\* cited by examiner

CARBON NANOTUBE-INFUSED FIBER MATERIALS CONTAINING PARALLEL-ALIGNED CARBON NANOTUBES, METHODS FOR PRODUCTION THEREOF, AND COMPOSITE MATERIALS DERIVED THEREFROM

CROSS-REFERENCE TO RELATED APPLICATIONS

This application claims the benefit of priority under 35 U.S.C. §119 from U.S. Provisional Patent Application Ser. No. 61/300,783, filed Feb. 2, 2010, which is incorporated herein by reference in its entirety. This application is also related to U.S. patent application Ser. Nos. 12/611,073, 12/611,101 and 12/611,103, all filed on Nov. 2, 2009, and 12/938,328, filed on Nov. 2, 2010, each of which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to carbon nanotubes, and, more particularly, to carbon nanotubes grown on fiber materials.

BACKGROUND

The increased use of composite materials in various high performance applications has raised the demand for materials having improved performance characteristics. Improved performance characteristics can include mechanical properties such as, for example, improved tensile strength, stress/strain performance, impact resistance, Young's Modulus, shear strength, shear modulus, toughness, compression strength, and/or compression modulus. To enhance these properties and others, composite materials contain a filler, typically a fiber material, that conveys its characteristics to the bulk composite matrix (e.g., a polymer matrix, a metal matrix, a ceramic matrix, or a glass matrix), thereby imparting enhanced properties to the composite material as a whole.

The fiber material of a fiber-containing composite material can be particularly critical for imparting enhanced properties to the composite material. Since the properties of the fiber material are imparted to the composite material as a whole, enhancement of the mechanical properties of the fiber material can result in improved properties of the bulk composite material. Conventional microscale fiber materials typically exhibit tensile strengths ranging from about 800 ksi to about 900 ksi. A number of enhanced fiber materials have improved upon these values, but many of these enhanced fiber materials are not amenable to large scale production due to their inability to produce defect-free continuous fibers. Further, many of these enhanced fiber materials are quite costly.

Nanoscale reinforcement of composite materials is another strategy that has been pursued to improve the mechanical properties of composite materials. Nanoscale reinforcement has most often been performed with carbon nanotubes, which have exceptionally high tensile strengths. Multi-wall carbon nanotubes, for example, have the highest tensile strength of any material yet measured, with a tensile strength of approximately 63 GPa having been achieved. Moreover, theoretical calculations have predicted a possible tensile strength of up to about 300 GPa for certain carbon nanotubes. Composite material reinforcement strategies utilizing carbon nanotubes have typically involved the dispersion of carbon nanotubes in the composite matrix as a separate and distinct component from the fiber material. Most of these composite materials have attempted to align the carbon nanotubes in a substantially parallel arrangement relative to one another. In spite of the promise offered by carbon nanotubes as a nanoscale reinforcement material, complex issues can be encountered when incorporating carbon nanotubes in a composite matrix. These issues can include, for example, increased matrix viscosity upon carbon nanotube loading and uncertain carbon nanotube orientation and gradient control.

In view of the foregoing, a scalable, high quality, and cost effective strategy for preparing enhanced fiber materials would be of substantial benefit in the art. In a non-limiting example, such enhanced fiber materials can be used in the preparation of high performance composite materials. The present disclosure satisfies these needs and provides related advantages as well.

SUMMARY

In some embodiments, the present disclosure describes carbon nanotube-infused fiber materials containing a fiber material and a layer of carbon nanotubes infused to the fiber material. The infused carbon nanotubes are aligned substantially parallel to the longitudinal axis of the fiber material. At least a portion of the substantially parallel-aligned, infused carbon nanotubes are crosslinked to each other, to the fiber material, or to both.

In some embodiments, the present disclosure describes composite materials containing a matrix material and a carbon nanotube-infused fiber material that contains a fiber material and a layer of carbon nanotubes infused to the fiber material. The infused carbon nanotubes are aligned substantially parallel to the longitudinal axis of the fiber material. At least a portion of the substantially parallel-aligned, infused carbon nanotubes are crosslinked to each other, to the fiber material, or to both.

In some embodiments, methods of the present disclosure include providing a carbon nanotube-infused fiber material that contains a fiber material and carbon nanotubes infused to the fiber material that are aligned substantially perpendicular to the surface of the fiber material, and reorienting the substantially perpendicular-aligned, infused carbon nanotubes so as to form a layer of infused carbon nanotubes that are aligned substantially parallel to the longitudinal axis of the fiber material.

In some embodiments, methods of the present disclosure include providing a continuous fiber material, and growing a layer of carbon nanotubes on the continuous fiber material in the presence of an electric field or a magnetic field. The carbon nanotubes are infused to the continuous fiber material so as to form a carbon nanotube-infused fiber material. The electric field or the magnetic field is oriented such that the infused carbon nanotubes are aligned substantially parallel to the longitudinal axis of the fiber material.

In some embodiments, methods of the present disclosure include providing a carbon nanotube-infused fiber material that contains a fiber material and carbon nanotubes infused to the fiber material that are aligned substantially perpendicular to the surface of the fiber material; adding a crosslinking polymer to the carbon nanotube-infused fiber material to form crosslinked, substantially perpendicular-aligned, infused carbon nanotubes; and reorienting the crosslinked, substantially perpendicular-aligned, infused carbon nanotubes so as to form a layer of crosslinked, infused carbon nanotubes that are aligned substantially parallel to the longitudinal axis of the fiber material. The crosslinking polymer forms pi-stacking interactions with the crosslinked, substantially perpendicular-aligned, infused carbon nanotubes.

In some embodiments, continuous carbon nanotube growth processes described herein include providing a continuous fiber material; growing carbon nanotubes on the continuous fiber material in a continuous carbon nanotube growth process, where the carbon nanotubes are infused to the fiber material so as to form a carbon nanotube-infused fiber material; crosslinking at least a portion of the infused carbon nanotubes to each other, to the fiber material, or both; and orienting the crosslinked, infused carbon nanotubes by a mechanical process or a chemical process so as to form a layer of crosslinked, infused carbon nanotubes that are aligned substantially parallel to the longitudinal axis of the continuous fiber material. Crosslinking involves treating the infused carbon nanotubes with a crosslinking polymer that forms pi-stacking interactions with the infused carbon nanotubes so as to form crosslinked, infused carbon nanotubes.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing a specific embodiments of the disclosure, wherein.

DETAILED DESCRIPTION

The present disclosure is directed, in part, to carbon nanotube-infused fiber materials containing substantially parallel-aligned, infused carbon nanotubes and composite materials containing the same. The present disclosure is also directed, in part, to methods for preparing carbon nanotube-infused fiber materials containing substantially parallel-aligned, infused carbon nanotubes.

In composite materials containing a fiber material and a matrix material, enhanced physical and/or chemical properties of the fiber material can be imparted to the composite material as a whole. Composite materials containing fiber materials that have been infused with carbon nanotubes are one way in which current technological barriers can be overcome to form advanced materials having both improved mechanical strength and additional potential benefits such as, for example, electrical conductivity and thermal conductivity. The substantially parallel alignment of the carbon nanotubes in the present carbon nanotube-infused fiber materials and composite materials derived therefrom allows these properties to be further augmented. Applicants' theoretical studies have indicated, for example, a greater than 2-fold tensile strength enhancement over that of conventional fiber materials in the present carbon nanotube-infused fiber materials. Further, substantially parallel carbon nanotube alignment in the present carbon nanotube-infused fiber materials can allow for closer fiber spacing in a composite material, thereby allowing further mechanical property improvements to be realized.

Carbon nanotube-infused fiber materials containing substantially parallel-aligned carbon nanotubes are a versatile platform for introducing carbon nanotubes into a matrix material in a substantially aligned state, thereby allowing a significant problem in forming carbon nanotube-containing composite materials to be overcome. In addition, by varying, the length and density of coverage of the carbon nanotubes on the fiber material, for example, different properties can be selectively expressed in a composite material. For example, shorter carbon nanotubes can be used to convey structural support to a composite material. Longer carbon nanotubes, in addition to conveying structural support, can be used to establish an electrically conductive or a thermally conductive percolation pathway in a composite material that is normally poorly conductive or non-conductive. In addition, non-uniform or gradient placement of the carbon nanotube-infused fiber materials in a composite material can be used to selectively convey desired properties to selected parts of a composite material.

Figure 1:
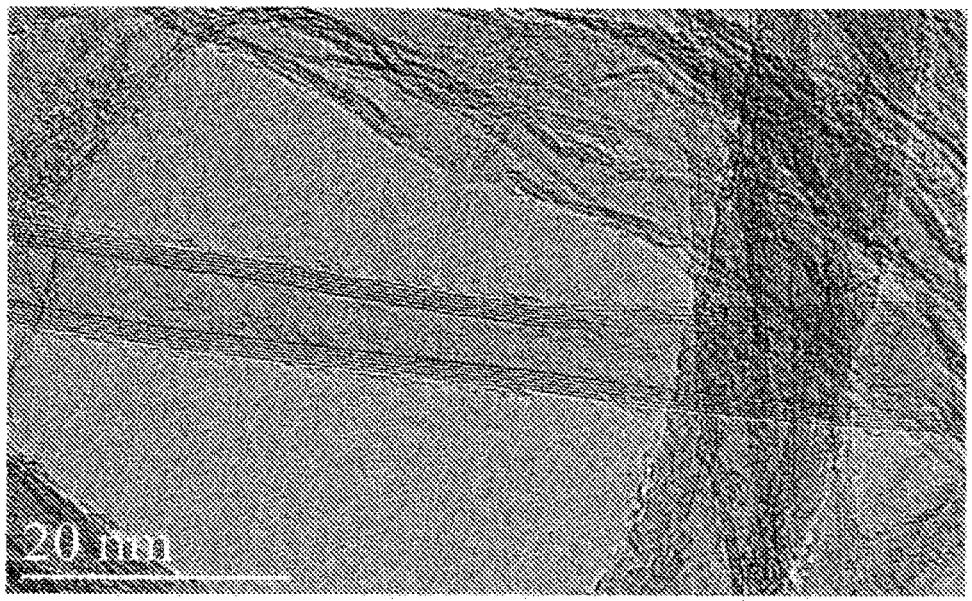
FIG. 1 shows an illustrative TEM image of carbon nanotubes that have been infused to carbon fibers.
Figure 2:
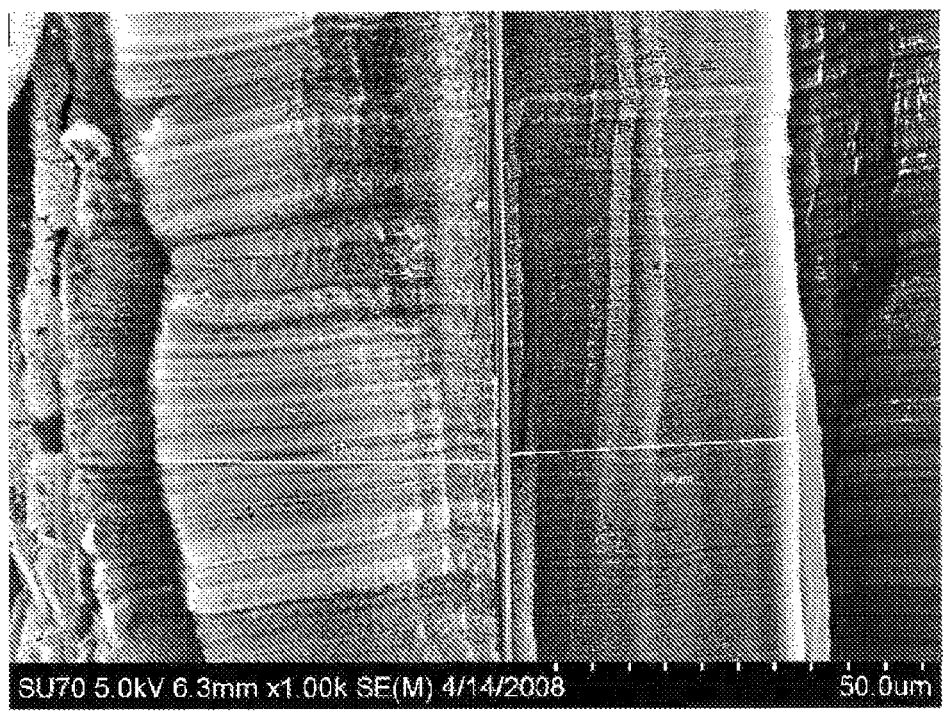
FIG. 2 shows an illustrative SEM image of a carbon fiber that has been infused with carbon nanotubes, where the carbon nanotubes are within ±20% of a targeted length of 40 μm.

Fiber materials that have been infused with carbon nanotubes, including carbon fibers, ceramic fibers, metal fibers, glass fibers and organic fibers, are described in Applicants' co-pending U.S. patent application Ser. Nos. 12/611,073, 12/611,101, and 12/611,103, all filed on Nov. 2, 2009, and 12/938,328, filed on Nov. 2, 2010, each of which is incorporated herein by reference in its entirety. FIG. 1 shows an illustrative TEM image of carbon nanotubes that have been infused to carbon fibers. FIG. 2 shows an illustrative SEM image of a carbon fiber that has been infused with carbon nanotubes, where the carbon nanotubes are within ±20% of a targeted length of 40 μM. In the images of FIGS. 1 and 2, the carbon nanotubes are multi-wall carbon nanotubes, although any type of carbon nanotube such as single-wall carbon nanotubes, double-wall carbon nanotubes, and multi-wall carbon nanotubes having more than two walls can be infused to a fiber material and used in the various embodiments described herein.

As used herein, the term "fiber material" refers to any material that has a fibrous component as a basic structural feature. The term encompasses continuous or non-continuous fibers, filaments, yarns, rovings, tows, tapes, woven and non-woven fabrics, plies, mats, and the like.

As used herein, the term "infused" refers to being bonded and "infusion" refers to the process of bonding. As such, a carbon nanotube-infused fiber material refers to a fiber material that has carbon nanotubes bonded thereto. Such bonding of carbon nanotubes to a fiber material can involve mechanical attachment, covalent bonding, ionic bonding, pi-pi interactions (pi-stacking interactions), and/or van der Waals force-mediated physisorption. In some embodiments, the carbon nanotubes are directly bonded to the fiber material. In other embodiments, the carbon nanotubes are indirectly bonded to the fiber material via a barrier coating and/or a catalytic nanoparticle used to mediate growth of the carbon nanotubes. The particular manner in which the carbon nanotubes are infused to the fiber material can be referred to as the bonding motif.

As used herein, the terms "crosslinking" or "crosslinked" refer to a chemical interaction or electronic association between a carbon nanotube and at least one other material. Crosslinking can involve ionic bonding, covalent bonding and/or pi-stacking interactions in various embodiments.

As used herein, the term "nanoparticle" refers to particles having a diameter between about 0.1 nm and about 100 nm in equivalent spherical diameter, although nanoparticles need not necessarily be spherical in shape. As used herein, the term "catalytic nanoparticle" refers to a nanoparticle that possesses catalytic activity for mediating carbon nanotube growth.

As used herein, the term "transition metal" refers to any element or alloy of elements in the d-block of the periodic table (Groups 3 through 12), and the term "transition metal salt" refers to any transition metal compound such as, for example, transition metal oxides, carbides, nitrides, and the like. Illustrative transition metals that form catalytic nanoparticles suitable for synthesizing carbon nanotubes include, for example, Ni, Fe, Co, Mo, Cu, Pt, Au, Ag, alloys thereof, salts thereof, and mixtures thereof.

As used herein, the terms "sizing agent," or "sizing," collectively refer to materials used in the manufacture of fiber materials as a coating to protect the integrity of the fiber material, to provide enhanced interfacial interactions between the fiber material and a matrix material, and/or to alter and/or to enhance certain physical properties of the fiber material.

As used herein, the terms "spoolable lengths" or "spoolable dimensions" equivalently refer to a fiber material that has at least one dimension that is not limited in length, thereby allowing the fiber material to be stored on a spool or mandrel following infusion with carbon nanotubes. A fiber material of "spoolable lengths" or "spoolable dimensions" has at least one dimension that indicates the use of either batch or continuous processing for carbon nanotube infusion to the fiber material. An illustrative carbon fiber material of spoolable dimensions that is commercially available is AS4 12K carbon fiber tow with a tex value of 800 (1 tex=1 g/1,000 m) or 620 yard/lb. (Grafil, Inc., Sacramento, Calif.). Commercial carbon fiber tow can be obtained in 5, 10, 20, 50, and 100 lb. spools, for example, although larger spools can require special order.

As used herein, the term "uniform in length" refers to a condition in which carbon nanotubes have lengths with tolerances of plus or minus about 20% or less of the total carbon nanotube length, for carbon nanotube lengths ranging from about 1 μm to about 500 μm. At very short carbon nanotube lengths (e.g., about 1 μm to about 4 μm), the tolerance can be plus or minus about 1 μm, that is, somewhat more than about 20% of the total carbon nanotube length.

As used herein, the term "uniform in density distribution" refers to a condition in which the carbon nanotube density on a fiber material has a tolerance of plus or minus about 10% coverage over the fiber material surface area that is covered by carbon nanotubes.

As used herein, the term "matrix material" refers to the continuous phase in a composite material than can serve to organize carbon nanotube-infused fiber materials into particular orientations, including random orientations, aligned orientations, perpendicular orientations, parallel orientations, and combinations thereof. Illustrative matrix materials include, for example, polymers, metals, glass and ceramics.

As used herein, the term "continuous process" refers to a multi-stage process that operates in a substantially uninterrupted manner.

In some embodiments, the present disclosure describes carbon nanotube-infused fiber materials containing a fiber material and a layer of carbon nanotubes infused to the fiber material. The infused carbon nanotubes are aligned substantially parallel to the longitudinal axis of the fiber material. At least a portion of the substantially parallel-aligned, infused carbon nanotubes are crosslinked to each other, to the fiber material, or to both.

In various embodiments, the substantially parallel-aligned, infused carbon nanotubes are in an at least partially crosslinked state. In some embodiments, at least a portion of the substantially parallel-aligned, infused carbon nanotubes are crosslinked to other carbon nanotubes in the layer of substantially parallel-aligned, infused carbon nanotubes. In other embodiments, at least a portion of the substantially parallel-aligned infused, carbon nanotubes are crosslinked to the fiber material. In still other embodiments, at least a portion of the substantially parallel-aligned, infused carbon nanotubes are crosslinked to other carbon nanotubes in the layer of substantially parallel-aligned, infused carbon nanotubes and to the fiber material.

Crosslinking of the substantially parallel-aligned, infused carbon nanotubes can occur through a chemical or electronic interaction between the carbon nanotubes and another material. That is, according to the present embodiments, crosslinking can involve an energetically favorable electronic association between the carbon nanotubes and another material, not just the formation of covalent bonds therebetween. For example, in some embodiments, crosslinking can involve ionic bonding between the substantially parallel-aligned, infused carbon nanotubes and another material. In other embodiments, crosslinking can involve pi-stacking interactions between the substantially parallel-aligned, infused carbon nanotubes and another material. In still other embodiments, however, crosslinking can involve covalent bonding between the substantially parallel-aligned, infused carbon nanotubes and another material.

Crosslinking of the substantially parallel-aligned, infused carbon nanotubes can occur at a single point on the carbon nanotubes in some embodiments. In other embodiments, however, crosslinking to the carbon nanotubes can occur at multiple points (i.e., more than one) on the carbon nanotubes. One of ordinary skill in the art will recognize that multiple points of interaction between the carbon nanotubes and another material will result in energetically more favorable interactions and/or stronger covalent bonding therebetween. Particularly, when there are multiple pi-stacking interactions between a carbon nanotube and another material, the strength of the interaction therebetween can approach or even exceed that of a covalent bond.

In some embodiments, a crosslinking polymer forms the pi-stacking interactions with the substantially parallel-aligned, infused carbon nanotubes. In general, crosslinking polymers operable for forming pi-stacking interactions with carbon nanotubes are rigid rod aromatic polymers, which can interact with the aromatic rings of the carbon nanotubes. Illustrative rigid rod aromatic polymers capable of forming pi-stacking interactions with carbon nanotubes are described in U.S. Pat. Nos. 7,241,496; 7,244,407; 7,296,576; and 7,344,691, each of which is incorporated herein by reference in its entirety. In some embodiments, the crosslinking polymer is a poly(phenyleneethynlene). An illustrative rigid rod aromatic polymer suitable for practicing the present embodiments is KENTERA, which is available from Zyvex Performance Materials (Columbus, Ohio).

In any of the various embodiments described herein, the fiber material infused with carbon nanotubes can include, for example, glass fibers, carbon fibers, metal fibers, ceramic fibers, and organic fibers (e.g., aramid fibers). More specific examples of fiber materials can include, for example, silicon carbide (SiC) fibers, boron carbide ($B_4C$) fibers, silicon nitride ($Si_3N_4$) fibers, aluminum oxide ($Al_2O_3$) fibers and various combinations thereof.

There are three types of carbon fibers that can be categorized based on the precursors used to generate the fibers, any of which can be used in the various embodiments described herein: Rayon, Polyacrylonitrile (PAN) and Pitch. Carbon fibers from rayon precursors, which are cellulosic materials, have a relatively low carbon content of about 20%, and the fibers tend to have a low strength and stiffness. In contrast, PAN precursors provide carbon fibers having a carbon content of about 55% and an excellent tensile strength due to a minimum of surface defects. Pitch precursors based on petroleum asphalt, coal tar, and polyvinyl chloride can also be used to produce carbon fibers. Although pitches are relatively low in cost and high in carbon yield, there can be issues of non-uniformity in a given batch of the resultant carbon fibers.

Figure 3:
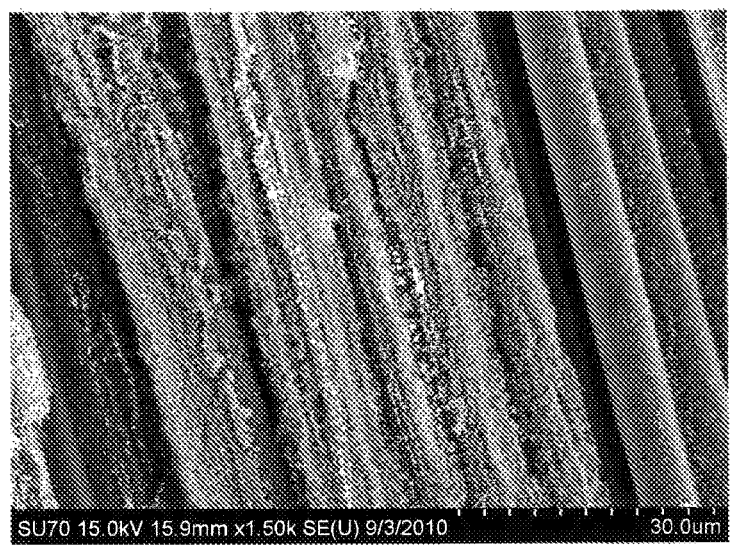
FIG. 3 shows an illustrative SEM image of a carbon fiber tow within a fabric weave of carbon nanotube-infused carbon fibers.

In various embodiments, the fiber material is of a continuous length. In various embodiments, the fiber material has a diameter ranging between about 1 µm and about 100 µm. Continuous length fiber materials having diameters in this range are readily available from a variety of commercial sources In various embodiments, the carbon nanotube-infused fiber material can be in any of a variety of forms, including those containing single filaments as well as those containing a plurality of fibers. One of ordinary skill in the art will recognize that a continuous length of fiber material can facilitate a continuous process for infusing carbon nanotubes thereto, as will be discussed hereinafter. In various embodiments, the carbon nanotube-infused fiber material can be in non-limiting forms such as, for example, filaments, rovings, yarns, fiber tows, tapes, braids, woven fabrics, non-woven fabrics, fiber plies and fiber mats. As a non-limiting example, FIG. 3 shows an illustrative SEM image of a carbon fiber tow within a fabric weave of carbon nanotube-infused carbon fibers. Further, the various woven and non-woven forms of carbon nanotube-infused fibers mentioned above can contain any mixture of these or other fiber types, including those not containing carbon nanotubes, if desired.

In various embodiments, carbon nanotubes of uniform length and density distribution can be infused to spoolable lengths of filaments, rovings, fiber tows, tapes, fabrics and other three-dimensional woven structures. While various filaments, fiber tows, yarns, mats, woven and non-woven fabrics and the like can be directly infused with carbon nanotubes, it is also possible to generate such higher ordered structures from the parent fiber tow, yarn or the like from carbon nanotube-infused fibers. For example, a carbon nanotube-infused fiber material can be transformed into a woven fabric from a carbon nanotube-infused fiber tow.

Filaments include high aspect ratio fibers having diameters generally ranging in size between about 1 µm and about 100 µm. Rovings include soft strands of fiber that have been twisted, attenuated and freed of foreign matter.

Fiber tows are generally associated bundles of filaments, which can be twisted together to give yarns in some embodiments. Yarns include closely associated bundles of twisted filaments, wherein each filament diameter in the yarn is relatively uniform. Yarns have varying weights described by their 'tex,' (expressed as weight in grams per 1000 linear meters), or 'denier' (expressed as weight in pounds per 10,000 yards). For yarns, a typical tex range is usually between about 200 and about 2000.

Fiber braids represent rope-like structures of densely packed fibers. Such rope-like structures can be assembled from yarns, for example. Braided structures can include a hollow portion. Alternately, a braided structure can be assembled about another core material.

Fiber tows can also include associated bundles of untwisted filaments. As in yarns, the individual filament diameter in a fiber tow is generally uniform. Fiber tows also have varying weights and a tex range that is usually between about 200 and 2000. In addition, fiber tows are frequently characterized by the number of thousands of filaments in the fiber tow, such as, for example, a 12K tow, a 24K tow, a 48K tow, and the like.

Tapes are fiber materials that can be assembled as weaves or as non-woven flattened fiber tows, for example. Tapes can vary in width and are generally two-sided structures similar to a ribbon. In the various embodiments described herein, carbon nanotubes can be infused to the fiber material of a tape on one or both sides of the tape. In addition, carbon nanotubes of different types, diameters or lengths can be grown on each side of a tape, which can be advantageous in certain applications. As described in Applicants' co-pending United States patent applications, infusion of carbon nanotubes to spools of tape can be conducted in a continuous manner.

In some embodiments, fiber materials can be organized into fabric or sheet-like structures. These include, for example, woven fabrics, non-woven fiber mats and fiber plies, in addition to the tapes described above. Such higher ordered structures can be assembled from parent fiber tows, yarns, filaments or the like, with carbon nanotubes already infused on the fiber material. As with tapes, such higher order structures can also be directly infused with carbon nanotubes according to the procedures described herein.

As described in Applicants' co-pending patent applications, a fiber material is modified to provide a layer (typically no more than a monolayer) of catalytic nanoparticles on the fiber material for the purpose of growing carbon nanotubes thereon. In various embodiments, the catalytic nanoparticles used for mediating carbon nanotube growth are transition metals and various salts thereof. In some embodiments, the catalytic nanoparticles can be deposited on the fiber material using techniques such as, for example, dip coating, spray coating, plasma deposition, evaporation techniques, electrolytic deposition techniques, and other processes known to those of ordinary skill in the art.

Carbon nanotubes can be metallic, semimetallic or semiconducting depending on their chirality. An established system of nomenclature for designating a carbon nanotube's chirality is recognized by those of ordinary skill in the art and is distinguished by a double index (n,m), where n and m are integers that describe the cut and wrapping of hexagonal graphite when formed into a tubular structure. In addition to chirality, a carbon nanotube's diameter also influences its electrical conductivity and the related property of thermal conductivity. In the synthesis of carbon nanotubes, the carbon nanotube's diameter can be controlled by using catalytic nanoparticles of a given size. Typically, a carbon nanotube's diameter is approximately that of the catalytic nanoparticle that catalyzes its formation. Therefore, the carbon nanotubes' properties can be controlled in one respect by adjusting the size of the catalytic nanoparticles used to synthesize the carbon nanotubes, for example. By way of non-limiting example, catalytic nanoparticles having a diameter of about 1 nm can be used to infuse a fiber material with single-wall carbon nanotubes. Larger catalytic nanoparticles can be used to prepare predominantly multi-wall carbon nanotubes, which have larger diameters because of their multiple nanotube layers, or mixtures of single-wall and multi-wall carbon nanotubes. Multi-wall carbon nanotubes typically have a more complex conductivity profile than do single-wall carbon nanotubes due to interwall reactions that can occur between the individual nanotube layers and redistribute current non-uniformly. By contrast, there is no change in current across different portions of a single-wall carbon nanotube.

The types of carbon nanotubes infused to the present fiber materials can generally vary without limitation. In various embodiments, the carbon nanotubes infused to the fiber material can be, for example, any of a number of cylindrically-shaped allotropes of carbon of the fullerene family including single-wall carbon nanotubes, double-wall carbon nanotubes, multi-wall carbon nanotubes, and any combination thereof. In some embodiments, the carbon nanotubes can be capped with a fullerene-like structure. Stated another way, the carbon nanotubes have closed ends in such embodiments. However, in other embodiments, the carbon nanotubes remain open-ended. In some embodiments, closed carbon nanotube ends can be opened through treatment with an appropriate oxidizing agent (e.g., $HNO_3/H_2SO_4$). In some embodiments, the carbon nanotubes encapsulate other materials. In some embodiments, the carbon nanotubes can be covalently functionalized after becoming infused to the fiber material. Functionalization can be used, for example, to increase the compatibility of the carbon nanotubes with a bulk composite matrix. In some embodiments, a plasma process can be used to promote functionalization of the carbon nanotubes.

In some embodiments, the fiber materials further include a barrier coating. Illustrative barrier coatings can include, for example, alkoxysilanes, methylsiloxanes, alumoxanes, alumina nanoparticles, spin on glass and glass nanoparticles. For example, in an embodiment the barrier coating is Accuglass T-11 Spin-On Glass (Honeywell International Inc., Morristown, N.J.). In some embodiments, the catalytic nanoparticles for carbon nanotube synthesis can be combined with the uncured barrier coating material and then applied to the fiber material together. In other embodiments, the barrier coating material can be added to the fiber material prior to deposition of the catalytic nanoparticles. In general, the barrier coating is sufficiently thin to allow exposure of the catalytic nanoparticles to a carbon feedstock gas for carbon nanotube growth. In some embodiments, the thickness of the barrier coating is less than or about equal to the effective diameter of the catalytic nanoparticles. In some embodiments, the thickness of the barrier coating is in a range between about 10 nm and about 100 nm. In other embodiments, the thickness of the barrier coating is in a range between about 10 nm and about 50 nm, including 40 nm. In some embodiments, the thickness of the barrier coating is less than about 10 nm, including about 1 nm, about 2 nm, about 3 nm, about 4 nm, about 5 nm, about 6 nm, about 7 nm, about 8 nm, about 9 nm, and about 10 nm, including all values and subranges therebetween.

Without being bound by theory, the barrier coating can serve as an intermediate layer between the fiber material and the carbon nanotubes and mechanically infuses the carbon nanotubes to the fiber material. Such mechanical infusion via a barrier coating provides a robust system for carbon nanotube growth in which the fiber material serves as a platform for organizing the carbon nanotubes, while still allowing the beneficial carbon nanotube properties to be conveyed to the fiber material. Moreover, benefits of including a barrier coating include, for example, protection of the fiber material from chemical damage due to moisture exposure and/or thermal damage at the elevated temperatures used to promote carbon nanotube growth.

After deposition of the catalytic nanoparticles, a chemical vapor deposition (CVD)-based process or other process for growing carbon nanotubes is used to continuously grow infused carbon nanotubes on the fiber material. The resultant carbon nanotube-infused fiber material is itself a composite architecture. Illustrative processes for carbon nanotube synthesis include, for example, micro-cavity, thermal or plasma-enhanced CVD techniques, laser ablation, arc discharge, flame synthesis and high pressure carbon monoxide (HiPCO) synthesis, all of which are known to those of ordinary skill in the art. In some embodiments, the CVD-based growth process can be plasma-enhanced by providing an electric field during the growth process such that the carbon nanotube growth follows the direction of the electric field.

In carbon nanotube-infused fiber materials prepared by the foregoing processes, the infused carbon nanotubes are usually infused to the fiber material such that they are substantially perpendicular to the surface of the fiber material, unless measures are taken during synthesis to control the growth orientation. Applicants have discovered, for example, that carbon nanotubes can be infused to the fiber material such that the infused carbon nanotubes are substantially parallel to the longitudinal axis of the fiber material by proper orientation of an electric field or a magnetic field during carbon nanotube growth. That is, a layer of infused carbon nanotubes that are aligned substantially parallel to the longitudinal axis of the fiber material can be directly obtained from the carbon nanotube growth process. If substantially parallel-aligned carbon nanotubes are not obtained from the carbon nanotube growth process, they can be reoriented into a layer of substantially parallel-aligned, infused carbon nanotubes, as described in further detail hereinafter.

In some embodiments, the present carbon nanotube-infused fiber materials can further include additional carbon nanotubes that are grown on the layer of substantially parallel-aligned, infused carbon nanotubes. Depending on the growth conditions, the additional carbon nanotubes can be grown such that they are aligned substantially perpendicular to the layer of substantially parallel-aligned, infused carbon nanotubes or such that they are aligned substantially parallel to the layer of substantially parallel-aligned, infused carbon nanotubes. That is, in some embodiments, the additional carbon nanotubes are aligned substantially parallel to the to the longitudinal axis of the fiber material. Like the layer of substantially parallel-aligned, infused carbon nanotubes on the fiber material, any additional carbon nanotubes that are not initially in a substantially parallel-aligned state can be reoriented according to the processes described hereinafter.

Synthesis of the additional carbon nanotubes can take place by any of the foregoing techniques described for growth of the infused carbon nanotubes. Further, growth of the infused carbon nanotubes and the additional carbon nanotubes can take place by the same or different carbon nanotube growth process. Generally, the additional carbon nanotubes can also be any of the types of carbon nanotubes described above. That is, the additional carbon nanotubes can be single-wall carbon nanotubes, double-wall carbon nanotubes, or multi-wall carbon nanotubes, including open- and closed-ended versions thereof and derivatives thereof. In some embodiments, the additional carbon nanotubes and the infused carbon nanotubes are the same. However, in other embodiments, the additional carbon nanotubes and the infused carbon nanotubes are different. When the infused carbon nanotubes and the additional carbon nanotubes are different, the differences can include different carbon nanotube types, different diameters, different lengths, or different types of functionalization, for example.

As described hereinabove, infused carbon nanotubes are grown from catalytic nanoparticles that are embedded in a barrier coating, and the infused carbon nanotubes concurrently or subsequently become oriented to form a layer of substantially parallel-aligned, infused carbon nanotubes. In the present embodiments, the additional carbon nanotubes are grown from catalytic nanoparticles that are deposited directly on the layer of substantially parallel-aligned, infused carbon nanotubes. That is, the additional carbon nanotubes are not of themselves infused to the fiber material via the barrier coating. In some embodiments, however, at least a portion of the additional carbon nanotubes can be crosslinked to at least a portion of the substantially parallel-aligned, infused carbon nanotubes. In some embodiments, at least a portion of the additional carbon nanotubes can be crosslinked to each other or to both each other and the substantially parallel-aligned, infused carbon nanotubes. Such crosslinking can result in good adherence of the additional carbon nanotubes to the fiber material, such that they are not easily removed therefrom. Crosslinking of the additional carbon nanotubes can be accomplished by any of the techniques set forth hereinabove.

In some embodiments, the carbon nanotubes grown on the fiber material can serve further purposes such as, for example, acting as a sizing agent to protect the fiber material from moisture, oxidation, abrasion, compression and/or other environmental conditions. Such a carbon nanotube-based sizing agent can be applied to a fiber material in lieu of or in addition to conventional sizing agents. A carbon nanotube-based sizing agent can also function as an interface between the carbon nanotube-infused fiber material and the matrix material of a composite material.

When present, conventional sizing agents can be applied before or after the infusion and growth of carbon nanotubes on the fiber material. Conventional sizing agents vary widely in type and function and include, for example, surfactants, anti-static agents, lubricants, siloxanes, alkoxysilanes, aminosilanes, silanes, silanols, polyvinyl alcohol, starch, and mixtures thereof. Such conventional sizing agents can be used to protect the carbon nanotubes themselves from various conditions or to convey further properties to the fiber material that are not imparted by the carbon nanotubes. In some embodiments, a conventional sizing agent can be removed from the fiber material prior to carbon nanotube growth. Optionally, a conventional sizing agent can be replaced with another conventional sizing agent that is more compatible with the carbon nanotubes or the carbon nanotube growth conditions.

After synthesis of the additional carbon nanotubes, the catalytic nanoparticles can optionally be removed from the carbon nanotube-infused fiber material. In some embodiments, the catalytic nanoparticles can be removed via an acid bath treatment. In some embodiments, the infused carbon nanotubes and/or the additional carbon nanotubes can be further purified (e.g., by liquid bromine treatment of the carbon nanotube-infused fiber material).

In further embodiments, after the additional carbon nanotubes have become substantially parallel-aligned to the longitudinal axis of the fiber material, deposition of further catalytic nanoparticles can again be performed and still more carbon nanotubes can be grown on the fiber material. Thus, the present carbon nanotube-infused fiber materials can have any number of layers of carbon nanotubes grown thereon. In some embodiments, the present carbon nanotube-infused fiber materials have a single layer of substantially parallel-aligned, infused carbon nanotubes thereon. That it, in such embodiments, the carbon nanotube-infused fiber materials contain a single layer of substantially parallel-aligned, infused carbon nanotubes. In other embodiments, the carbon nanotube-infused fiber materials can have a total number of layers, N, (one layer of substantially parallel-aligned, infused carbon nanotubes and N−1 layers of additional carbon nanotubes grown on the layer of substantially parallel-aligned, infused carbon nanotubes). In some embodiments, the total number of layers is between 1 and about 50. In some embodiments, the total number of layers is between 1 and about 25. In other embodiments, the total number of layers is between about 2 and about 10, or between about 2 and about 5, or between about 5 and about 25, or between about 25 and about 50.

In general, the carbon nanotube-infused fiber materials described in Applicants' co-pending patent applications have much higher carbon nanotube loading percentages than can be produced by other methods. For example, such carbon nanotube-infused fiber materials can contain about 1% to about 30% or even about 40% infused carbon nanotubes by weight. By having the option for multiple carbon nanotube layers in the present carbon nanotube-infused fiber materials, even higher weight percentages of carbon nanotubes can be grown on the fiber material in the present embodiments. In some embodiments, the present carbon nanotube-infused fiber materials can contain up to about 2000% carbon nanotubes by weight relative to the original fiber material. In some embodiments, the present carbon nanotube-infused fiber materials can contain about 1% to about 2000% or about 1% to about 1000% or about 1% to about 500% or about 1% to about 200% carbon nanotubes by weight relative to the original fiber material. In other embodiments, the present carbon nanotube-infused fiber materials can contain about 5% to about 50% or about 10% to about 40% carbon nanotubes by weight relative to the original fiber material. The chosen carbon nanotube weight percentage can be dictated by the given application in which the carbon nanotube-infused fiber material is to be employed, and given the benefit of the present disclosure, one of ordinary skill in the art can prepare a carbon nanotube-infused fiber material having a desired weight percentage for a specific application.

In addition to the number of carbon nanotube layers, the weight percentage of carbon nanotubes grown on the fiber material can also be determined by an average length of the carbon nanotubes. Thus, for a given carbon nanotube weight percentage, both the length of the carbon nanotubes and the number of carbon nanotube layers can be varied to achieve a desired weight percentage. As set forth previously, the length of the infused carbon nanotubes and the length of the additional carbon nanotubes can be substantially the same or different in the various embodiments described herein. As described immediately hereinafter, carbon nanotubes of different lengths can be used to convey different properties to a fiber material. Thus, in embodiments where the infused carbon nanotubes and the additional carbon nanotubes have substantially dissimilar lengths, different properties can be selectively conveyed to the interior and exterior regions of the present carbon nanotube-infused fiber materials.

In general, the carbon nanotube lengths in the present carbon nanotube-infused fiber materials can vary over a wide range. Further, the lengths of the infused carbon nanotubes and the additional carbon nanotubes can be varied independently. In some embodiments, an average length of the carbon nanotubes is between about 1 μm and about 10 μm. Carbon nanotubes having such lengths can be useful, for example, in applications to increase shear strength. In other embodiments, an average length of the carbon nanotubes is between about 5 μm and about 70 μm. Carbon nanotubes having such lengths can be useful for increasing tensile strength, for example, particularly when the carbon nanotubes are aligned substantially parallel to the longitudinal axis of the fiber material as in the present embodiments. In still other embodiments, an average length of the carbon nanotubes is between about 10 μm and about 100 μm. Carbon nanotubes having such lengths can be useful, for example, to improve electrical and thermal conductivity properties, in addition to mechanical properties. In some embodiments, an average length of the carbon nanotubes is between about 100 μm and about 500 μm. Carbon nanotubes having such lengths can be particularly useful to improve electrical and thermal conductivity properties, for example. In addition, carbon nanotubes having lengths greater than about 50 μm can be particularly useful, for example, for conferring flame resistance.

In some embodiments, the carbon nanotubes infused to the fiber material are generally uniform in length. In some embodiments, an average length of the carbon nanotubes is between about 1 μm and about 500 μm, including about 1 μm, about 2 μm, about 3 μm, about 4 μm, about 5 μm, about 6 μm, about 7 μm, about 8 μm, about 9 μm, about 10 μm, about 15 μm, about 20 μm, about 25 μm, about 30 μm, about 35 μm, about 40 μm, about 45 μM, about 50 μm, about 60 μm, about 70 μm, about 80 μm, about 90 μm, about 100 μm, about 150 μm, about 200 μm, about 250 μM, about 300 μm, about 350 μm, about 400 μm, about 450 μm, about 500 μm, and all values and subranges therebetween. In some embodiments, an average length of the carbon nanotubes is less than about 1 μM, including about 0.5 μm, for example, and all values and subranges therebetween. In some embodiments, an average length of the carbon nanotubes is between about 1 μm and about 10 μm, including, for example, about 1 μm, about 2 μm, about 3 μm, about 4 μm, about 5 μm, about 6 μm, about 7 μm, about 8 μm, about 9 μm, about 10 μm, and all values and subranges therebetween. In still other embodiments, an average length of the carbon nanotubes is greater than about 500 μm, including, for example, about 510 μm, about 520 μm, about 550 μm, about 600 μm, about 700 μm, and all values and subranges therebetween. In still other embodiments, an average length of the carbon nanotubes ranges between about 5 μm and about 50 μm or between about 5 μm and about 25 μM.

In some embodiments, the carbon nanotubes infused to the fiber material are generally uniform in density distribution, referring to the uniformity of the carbon nanotube density that is infused to the fiber material. As defined above, the tolerance for a uniform density distribution is plus or minus about 10% over the fiber material surface area that is infused with carbon nanotubes. By way of non-limiting example, this tolerance is equivalent to about ±1500 carbon nanotubes/μm² for a carbon nanotube having a diameter of 8 nm and 5 walls. Such a figure assumes that the space inside the carbon nanotube is fillable. In some embodiments, the maximum carbon nanotube density, expressed as a percent coverage of the fiber material (i.e., the percentage of the fiber material surface area that is covered with carbon nanotubes) can be as high as about 55%, again assuming a carbon nanotube having an 8 nm diameter, 5 walls and fillable space within. 55% surface area coverage is equivalent to about 15,000 carbon nanotubes/μm² for a carbon nanotube having the referenced dimensions. In some embodiments, the density of coverage is up to about 15,000 carbon nanotubes/μm². One of ordinary skill in the art will recognize that a wide range of carbon nanotube density distributions can be attained by varying the disposition of the catalytic nanoparticles on the surface of the fiber material, the exposure time of the fiber material to carbon nanotube growth conditions, and the actual growth conditions themselves used to infuse the carbon nanotubes to the fiber material. In addition, the additional carbon nanotubes grown on the layer of substantially parallel-aligned, infused carbon nanotubes can likewise be substantially uniform in density distribution and also varied over a wide range of density distributions. It should be noted that the above calculations are for a carbon nanotube-infused fiber material containing only a layer of substantially parallel-aligned, infused carbon nanotubes, but not additional carbon nanotubes grown thereon.

Applicants have developed a micromechanical model to calculate the expected tensile strength enhancement in the present carbon nanotube-infused fiber materials containing substantially parallel-aligned carbon nanotubes. For the model, a fiber material containing a layer of substantially parallel-aligned, infused carbon nanotubes and variable layers of additional substantially parallel-aligned carbon nanotubes were considered. The model assumes ideal carbon nanotube alignment and crosslinking with KENTERA in each layer, where the KENTERA produces optimized adhesion between the carbon nanotubes and the fiber material such that the carbon nanotubes strain at the same rate as the fiber material. That is, there is no slippage of the carbon nanotubes on the fiber material.

According to Applicants' model, the system is assumed to fail when either the carbon nanotubes or the fiber material fails. Since carbon nanotubes have a much higher tensile strength than the fiber material, fiber failure is always observed first in the model. For a carbon nanotube-infused fiber material having 13 layers of carbon nanotubes (1 layer of substantially parallel-aligned, infused carbon nanotubes and 12 layers of additional carbon nanotubes), a calculated tensile strength of 1833 ksi was determined, thus validating that over a 2-fold increase in tensile strength can be realized over that of conventional fiber materials. In actuality, the carbon nanotube-infused fiber material may be capable of withstanding fiber material failure if sufficient carbon nanotube layers are deposited thereon. That is, the carbon nanotubes can effectively provide mechanical support after failure of the fiber material due to their ability to bridge mechanical defects. Therefore, the actual tensile strength enhancement may be much higher than that calculated above.

In other various embodiments, the present disclosure provides methods for preparing carbon nanotube-infused fiber materials and composite materials derived therefrom.

In some embodiments, methods of the present disclosure include providing a carbon nanotube-infused fiber material that contains a fiber material and carbon nanotubes infused to the fiber material that are aligned substantially perpendicular to the surface of the fiber material, and reorienting the substantially perpendicular-aligned, infused carbon nanotubes so as to form a layer of infused carbon nanotubes that are aligned substantially parallel to the longitudinal axis of the fiber material.

In some embodiments, the present methods further include crosslinking at least a portion of the substantially perpendicular-aligned, infused carbon nanotubes to each other, to the fiber material, or to both the fiber material and each other. As previously described hereinabove, crosslinking can involve covalent bonding in some embodiments and pi-stacking interactions in other embodiments. As also described previously, a crosslinking polymer can form the pi-stacking interactions with the substantially perpendicular-aligned, infused carbon nanotubes in some embodiments.

In some embodiments, the present methods further include depositing catalytic nanoparticles on the layer of substantially parallel-aligned, infused carbon nanotubes, growing additional carbon nanotubes on the layer of substantially parallel-aligned, infused carbon nanotubes, and orienting the additional carbon nanotubes such that they are aligned substantially parallel to the longitudinal axis of the fiber material. In some embodiments, the methods further include crosslinking at least a portion of the additional carbon nanotubes to at least a portion of the substantially parallel-aligned, infused carbon nanotubes. Such crosslinking can also involve crosslinking at least a portion of the additional carbon nanotubes to each other or to both the substantially parallel-aligned, infused carbon nanotubes and to each other. As with the substantially parallel-aligned, infused carbon nanotubes, crosslinking can involve covalent bonding or pi-stacking interactions in various embodiments, and crosslinking can be facilitated by a crosslinking polymer in some embodiments.

Once a carbon nanotube-infused fiber material containing substantially perpendicular-aligned, infused carbon nanotubes has been prepared, realignment of the infused carbon nanotubes to form a layer of substantially parallel-aligned, infused carbon nanotubes can be conducted. Realignment of the substantially perpendicular-aligned, infused carbon nanotubes into a substantially parallel orientation can take place by a mechanical process or a chemical process, as discussed hereinafter. In alternative embodiments, substantially parallel alignment can occur concurrently with carbon nanotube synthesis. As referenced above, alignment of the carbon nanotubes into a substantially parallel orientation can occur concurrently with carbon nanotube synthesis by utilizing an appropriately oriented electric field or magnetic field during the carbon nanotube growth process. Like the infused carbon nanotubes, additional carbon nanotubes grown on the layer of substantially parallel-aligned, infused carbon nanotubes can also be oriented or reoriented using any of the aforesaid techniques.

In forming carbon nanotubes, growth tends to follow the direction of the applied electric field or magnetic field. Electromechanical means for aligning carbon nanotubes in a substantially parallel manner include, for example, use of electric fields or magnetic fields that are aligned substantially parallel to the fiber material during carbon nanotube growth, such that the carbon nanotubes become aligned substantially parallel to the longitudinal axis of the fiber material during the growth process. By properly adjusting the geometry of the plasma spray or like carbon feedstock source and the electric field or magnetic field in a carbon nanotube growth process that produces substantially parallel-aligned carbon nanotubes, a separate realignment step after carbon nanotube synthesis can be avoided.

Mechanical means for aligning carbon nanotubes in a substantially parallel manner can include, for example, extrusion, pultrusion, gas pressure aided dies, conventional dies and mandrels. Use of these techniques and other related techniques that apply a shearing force in the direction of the longitudinal axis of the fiber material can realign carbon nanotubes thereon from a substantially perpendicular orientation into an orientation that is substantially parallel to the longitudinal axis of the fiber material.

Chemical means for aligning carbon nanotubes on a fiber material in a substantially parallel manner include the use of solvents, surfactants, and microemulsions that result in a sheathing effect as the fiber material is drawn out of a liquid containing these chemicals. Thus, drawing a carbon nanotube-infused fiber material from a liquid can realign at least some of the carbon nanotubes thereon into a substantially parallel orientation. In some embodiments, the chemical process involves crosslinking of at least a portion of the carbon nanotubes. Such crosslinking can be conducted using a crosslinking polymer such as those described hereinabove.

In some embodiments, combinations of electromechanical, mechanical, and/or chemical means can be used to achieve a desired degree of carbon nanotube alignment in a carbon nanotube-infused fiber material. That is, if an initial alignment procedure does not produce a desired degree of alignment, the alignment procedure can be repeated a number of times, or a different alignment procedure can be used.

In some embodiments, the fiber materials used in the present methods are of a continuous length. That is, the fiber materials are of spoolable dimensions such that the growth of carbon nanotubes on the fiber materials can be conducted using a continuous carbon nanotube growth process. Further, the alignment of the carbon nanotubes into a substantially parallel orientation can be operatively coupled to the continuous carbon nanotube growth process.

Figure 4:
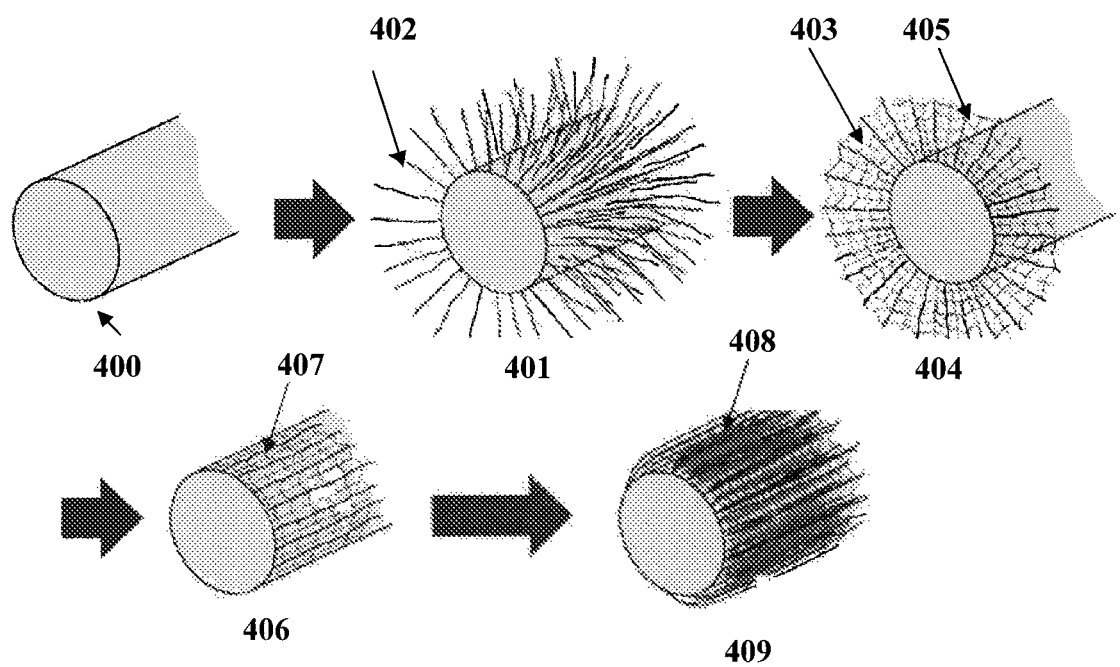
FIG. 4 shows an illustrative chemical process through which a carbon nanotube-infused fiber material having substantially parallel-aligned, infused carbon nanotubes can be prepared.

FIG. 4 shows an illustrative chemical process through which a carbon nanotube-infused fiber material having substantially parallel-aligned, infused carbon nanotubes can be prepared. Starting with fiber material 400, carbon nanotube-infused fiber material 401 can be initially prepared according to the continuous carbon nanotube growth procedures set forth herein and also described in Applicants' co-pending patent applications. Carbon nanotube-infused fiber material 401 has its carbon nanotubes 402 infused to fiber material 400 in a substantially perpendicular-aligned manner relative to the fiber surface. Next, carbon nanotube-infused fiber material 401 can be treated to form crosslinks 403 between the carbon nanotubes, thereby forming crosslinked carbon nanotube-infused fiber material 404. At this point, crosslinked carbon nanotubes 405 are still aligned substantially perpendicular to the fiber surface. Crosslinked carbon nanotubes 405 can then be reoriented into a substantially parallel alignment in parallel-aligned carbon nanotube-infused fiber material 406, wherein the substantially parallel-aligned, infused carbon nanotubes form layer 407 on parallel-aligned carbon nanotube-infused fiber material 406.

Optionally, additional catalytic nanoparticles suitable for forming carbon nanotubes can be deposited on layer 407 and additional carbon nanotubes can be grown thereon (steps not shown). The additional carbon nanotubes can be grown with substantially parallel alignment relative to the longitudinal axis of the fiber material or they can be reoriented by any of the aforementioned realignment techniques to form a layer of additional carbon nanotubes 408 on layer 407. The additional carbon nanotubes can include crosslinks therebetween and/or crosslinks to the substantially parallel-aligned, infused carbon nanotubes in layer 407. In this process, multi-layer parallel-aligned carbon nanotube infused fiber material 409 is formed. Thereafter, further layers of additional carbon nanotubes can be grown on layer 408 by repeating the catalyst deposition, carbon nanotube growth, carbon nanotube orientation, and optional crosslinking operations. Optionally, the catalytic nanoparticles can be removed after each layer deposition, but catalyst removal is by no means required.

In some embodiments, methods of the present disclosure can be performed without a separate operation of realigning the carbon nanotubes infused to the fiber material. That is, in some embodiments, carbon nanotube infusion to the fiber material can be conducted such that substantially parallel-aligned, infused carbon nanotubes are directly obtained from the carbon nanotube synthesis.

In some embodiments, the methods of the present disclosure include providing a continuous fiber material, and growing a layer of carbon nanotubes on the continuous fiber material in the presence of an electric field or a magnetic field. The carbon nanotubes are infused to the continuous fiber material so as to form a carbon nanotube-infused fiber material. The electric field or the magnetic field is oriented such that the infused carbon nanotubes are aligned substantially parallel to the longitudinal axis of the fiber material.

When substantially parallel-aligned, infused carbon nanotubes are directly obtained from the carbon nanotube synthesis, the carbon nanotubes can also be crosslinked in some embodiments. Thus, in some embodiments, the present methods further include crosslinking at least a portion of the substantially parallel-aligned, infused carbon nanotubes to each other, to the fiber material, or to both the fiber material and each other. As recited previously, crosslinking can involve covalent bonding to the infused carbon nanotubes in some embodiments and pi-stacking interactions with the infused carbon nanotubes in other embodiments. In some embodiments, a crosslinking polymer forms the pi-stacking interactions with the substantially parallel-aligned, infused carbon nanotubes. It should be noted that crosslinking in this case occurs after the infused carbon nanotubes have been pre-aligned in a substantially parallel orientation.

Further operations with the fiber material containing crosslinked, substantially parallel-aligned, infused carbon nanotubes then proceed analogously to the procedures set forth above. That is, in some embodiments, the methods further include depositing catalytic nanoparticles on the layer of substantially parallel-aligned, infused carbon nanotubes, growing additional carbon nanotubes on the layer of substantially parallel-aligned, infused carbon nanotubes, and orienting the additional carbon nanotubes such that they are aligned substantially parallel to the longitudinal axis of the continuous fiber material. In some embodiments, the methods further include crosslinking at least a portion of the additional carbon nanotubes to at least a portion of the substantially parallel-aligned, infused carbon nanotubes. Such crosslinking can also involve crosslinking at least a portion of the additional carbon nanotubes to each other or to both the substantially parallel-aligned, infused carbon nanotubes and to each other. As with the infused carbon nanotubes, crosslinking can involve covalent bonding or pi-stacking interactions in various embodiments, and crosslinking can be facilitated by a crosslinking polymer in some embodiments.

In some embodiments, methods of the present disclosure include, providing a carbon nanotube-infused fiber material that contains a fiber material and carbon nanotubes infused to the fiber material that are aligned substantially perpendicular to the surface of the fiber material, adding a crosslinking polymer to the carbon naontube-infused fiber material to form crosslinked, substantially perpendicular-aligned, infused carbon nanotubes, and reorienting the crosslinked, substantially perpendicular-aligned, infused carbon nanotubes so as to form a layer of crosslinked, infused carbon nanotubes that are aligned substantially parallel to the longitudinal axis of the fiber material. The crosslinking polymer forms pi-stacking interactions with the crosslinked, substantially perpendicular-aligned, infused carbon nanotubes.

In some embodiments, continuous carbon nanotube growth processes described herein include providing a continuous fiber material; growing carbon nanotubes on the continuous fiber material in a continuous carbon nanotube growth process, where the carbon nanotubes are infused to the fiber material so as to form a carbon nanotube-infused fiber material; crosslinking at least a portion of the infused carbon nanotubes to each other, to the fiber material, or both; and orienting the crosslinked, infused carbon nanotubes by a mechanical process or a chemical process so as to form a layer of crosslinked, infused carbon nanotubes that are aligned substantially parallel to the longitudinal axis of the continuous fiber material. Crosslinking involves treating the infused carbon nanotubes with a crosslinking polymer that forms pi-stacking interactions with the infused carbon nanotubes so as to form crosslinked, infused carbon nanotubes.

Once crosslinked, substantially parallel-aligned, infused carbon nanotubes have been prepared in the continuous carbon nanotube growth process, growth of additional carbon nanotube layers can then be performed. In such embodiments, the continuous carbon nanotube growth processes further include depositing catalytic nanoparticles on the layer of crosslinked, substantially parallel-aligned, infused carbon nanotubes, growing additional carbon nanotubes on the layer of crosslinked, substantially parallel-aligned, infused carbon nanotubes, and orienting the additional carbon nanotubes such that they are aligned substantially parallel to the longitudinal axis of the fiber material. In some embodiments, the continuous processes further include crosslinking at least a portion of the additional carbon nanotubes to at least a portion of the crosslinked, substantially parallel-aligned, infused carbon nanotubes. Such crosslinking can also involve crosslinking at least a portion of the additional carbon nanotubes to each other or to both the crosslinked, substantially parallel-aligned, infused carbon nanotubes and to each other. As with the infused carbon nanotubes, crosslinking can involve covalent bonding or pi-stacking interactions in various embodiments, and crosslinking can be facilitated by a crosslinking polymer in some embodiments.

In various embodiments, methods of the present disclosure can further include placing the carbon nanotube-infused fiber material in a matrix material, thereby forming a composite material.

In various embodiments, the present disclosure describes composite materials. The composite materials contain a matrix material and a carbon nanotube-infused fiber material that contains a fiber material and a layer of carbon nanotubes infused to the fiber material. The infused carbon nanotubes are aligned substantially parallel to the longitudinal axis of the fiber material. At least a portion of the substantially parallel-aligned, infused carbon nanotubes are crosslinked to each other, to the fiber material, or to each other and to the fiber material. In various embodiments, crosslinking can involve covalent bonding, and in other embodiments, crosslinking can involve pi-stacking interactions. In some embodiments, a crosslinking polymer forms the pi-stacking interactions with substantially parallel-aligned, infused carbon nanotubes.

In some embodiments, the present composite materials further include additional carbon nanotubes grown on the layer of substantially parallel-aligned, infused carbon nanotubes. In some embodiments, the additional carbon nanotubes are aligned substantially parallel to the longitudinal axis of the fiber material. That is, in some embodiments, the additional carbon nanotubes form one or more layers upon the layer of substantially parallel-aligned, infused carbon nanotubes. In some embodiments, at least a portion of the additional carbon nanotubes are crosslinked to at least a portion of the substantially parallel-aligned, infused carbon nanotubes. In some embodiments, at least a portion of the additional carbon nanotubes can also be crosslinked to each other or to both the substantially parallel-aligned, infused carbon nanotubes and each other. Growth, substantially parallel alignment of the carbon nanotubes, and crosslinking have been considered in more detail hereinabove.

In various embodiments, matrix materials in the present composite materials include, for example, polymer matrices, ceramic matrices, glass matrices and metal matrices. Incorporation of carbon nanotube-infused fiber materials in various composite matrix materials are described in Applicants' co-pending U.S. patent application Ser. Nos. 12/952,144, filed on Nov. 22, 2010; 12/953,434 and 12/953,447, both filed on Nov. 23, 2010; and 12/963,589, filed on Dec. 8, 2010; each of which is incorporated herein by reference in its entirety.

In general, thermoplastic polymers, thermosetting polymers and elastomeric polymers are suitable polymer matrices for the present composite materials. Suitable thermosetting polymer matrices include, for example, phthalic/maleic type polyesters, vinyl esters, epoxies, phenolics, cyanates, bismaleimides, and nadic end-capped polyimides (e.g., PMR-15). Suitable thermoplastic polymer matrices include, for example, polyethylenes, polypropylenes, polyetheretherketones, polysulfones, polyamides, polycarbonates, polyphenylene oxides, polyphenylene sulfides, polysulfides, polyether ether ketones, polyether sulfones, polyamide-imides, polyetherimides, polyimides, polyarylates, and liquid crystalline polyesters. In some embodiments, particularly suitable polymer matrices can include, for example, an epoxy, a polyester, a vinylester, a polyetherimide, a polyetherketoneketone, a polyphthalamide, a polyetherketone, a polyetheretherketone, a polyimide, a phenol-formaldehyde, or a bismaleimide.

A wide variety of metal matrices can be used in forming the composite materials described herein. In some embodiments, the metal matrix can include at least one metal such as, for example, aluminum, magnesium, copper, cobalt, nickel, zirconium, silver, gold, titanium and mixtures thereof. A mixture of metal matrices can be a metal alloy. As a non-limiting example, an illustrative metal alloy is a nickel-cobalt alloy.

Ceramic matrices suitable for use in the present composite materials can include, for example, binary, ternary or quaternary ceramic materials, which can be carbides, nitrides, borides or oxides in various embodiments. Illustrative ceramic matrices include, for example, silicon carbide, tungsten carbide, chromium carbide ($Cr_3C_2$), titanium carbide (TiC), titanium nitride (TiN), titanium boride ($TiB_2$), aluminum oxide, silicon nitride ($Si_3N_4$), SiCN, $Fe_2N$, $BaTiO_3$, lithium aluminosilicate or mullite (a silicate mineral having two stoichiometric forms: $3Al_2O_3.2SiO_2$ or $2Al_2O_3.SiO_2$). In some embodiments the ceramic matrix can be a cement.

In general, the fiber materials of the present composite materials can be any fiber material that can be infused with carbon nanotubes. In some embodiments, the fiber material can be, for example, carbon fibers, glass fibers, metal fibers, ceramic fibers or organic fibers (e.g., aramid fibers). Mixtures of various types of carbon nanotube-infused fiber materials can also be included in the present composite materials. Further, mixtures of carbon nanotube-infused fiber materials and fiber materials lacking carbon nanotube infusion can also be included in the present composite materials.

In some embodiments, the carbon nanotube-infused fiber materials are distributed uniformly in the matrix material. However, in other embodiments, the carbon nanotube-infused fiber materials are distributed non-uniformly in the matrix material. In embodiments having non-uniformly distributed carbon nanotube-infused fiber materials, the carbon nanotube-infused fiber materials can be used to selectively convey enhanced properties only to certain portions of the composite material. By way of non-limiting example, a composite material having a carbon nanotube-infused fiber material only near its surface can be used to enhance surface heat transfer properties or to convey surface impact resistance. In alternative embodiments, carbon nanotubes having different lengths can be infused to two or more different fiber materials, which can then be distributed non-uniformly in the composite material. For example, fiber materials having different lengths of carbon nanotubes infused thereon can be distributed in different portions of the composite material. In such embodiments, the carbon nanotubes having different lengths can differentially enhance the portions of the composite material in which they are distributed. By way of non-limiting example, carbon nanotubes having a length sufficient to improve impact resistance can be infused to a fiber material and distributed near the surface of the composite material, and carbon nanotubes having a length sufficient to establish an electrically conductive percolation pathway can be infused to a fiber material and distributed in another region of the composite material. Other combinations of property enhancements can be envisioned by those of ordinary skill in the art in light of the present disclosure. In alternative embodiments, a non-uniform distribution can involve a gradient distribution of the carbon nanotube-infused fiber material in the composite material.

In some embodiments, the present composite materials can contain between about 0.1% and about 25% carbon nanotubes by weight. In other embodiments, the composite materials can contain between about 1% and about 15% carbon nanotubes by weight. In still other embodiments, the composite materials can contain between about 5% and about 20% carbon nanotubes by weight.

In some embodiments, the carbon nanotube-infused fiber materials are aligned with one another in a substantially parallel manner in the composite materials. In some embodiments, the carbon nanotube-infused fiber materials are distributed in a cross-ply orientation in the composite materials. That is, the carbon nanotube-infused fiber materials can be stacked in layers in the composite material, with the individual fibers in each layer being substantially perpendicular to individual fibers in adjacent layers in such embodiments. In alternative embodiments, the carbon nanotube-infused fiber materials can be oriented in a random or like non-aligned manner in the present composite materials. In some embodiments of the composite materials, the carbon nanotube-infused fiber materials can be chopped fibers. In other embodiments of the composite materials, the carbon nanotube-infused fiber materials can be continuous fibers.

In some embodiments of the composite materials, crosslinking can involve covalent bonding to the carbon nanotubes. In other embodiments, crosslinking can involve pi-stacking interactions to the carbon nanotubes. As previously described, a crosslinking polymer can form the pi-stacking interactions with the substantially parallel-aligned, infused carbon nanotubes in some embodiments. In some embodiments of the composite materials, the crosslinking polymer can also be crosslinked to the matrix material. In such embodiments, the compatibility between the carbon nanotube-infused fiber material and the matrix material can be increased, thereby leading to a stronger interaction between the two and a composite material having enhanced mechanical properties. In addition, the structure of the crosslinking polymer can be chemically modified to form the most suitable types of interactions with various matrix materials having a wide range of chemical characteristics. Still further, the crosslinking polymer can serve to enhance load transfer from the matrix material to the fiber material and the carbon nanotubes, thereby imparting improved tensile strength to the composite.

The present carbon nanotube-infused fiber materials and composite material derived therefrom have a number of potential uses. In some embodiments, articles containing a carbon nanotube-infused fiber material are described herein.

Carbon nanotube-infused conductive carbon fibers can be used in the manufacture of electrodes for electrical devices. In the production of superconducting fibers, it can be challenging to achieve adequate adhesion of the superconducting layer to a fiber material due, at least in part, to the different coefficients of thermal expansion of the fiber material and of the superconducting layer. Another difficulty in the art arises during the coating of the fiber material by a CVD process. For example, reactive gases (e.g., hydrogen gas or ammonia), can attack the fiber surface and/or form undesired hydrocarbon compounds on the fiber surface and make good adhesion of the superconducting layer more difficult. Carbon nanotube-infused carbon fiber materials can overcome these aforementioned challenges in the art.

Articles containing carbon nanotube-infused fiber materials can display improved wear resistance due to the presence of the carbon nanotubes. Articles that can benefit from these properties can include, without limitation, brake rotors, automobile drive shafts, rubber o-rings and gasket seals, tools, bearings, aircraft parts, and bicycle frames.

The large effective surface area of carbon nanotubes can make the carbon nanotube-infused fiber materials suitable for water filtration applications and other extractive processes, such as, for example, separation of organic oils from water. Carbon nanotube-infused fiber materials can also be used to remove organic toxins from water tables, water storage facilities, or in-line filters for home and office use.

In oilfield technologies, the present carbon nanotube-infused fiber materials can be useful in the manufacture of drilling equipment including, for example, pipe bearings, piping reinforcement, and rubber o-rings. Furthermore, carbon nanotube-infused fiber materials can be used in extractive processes that are also applicable to the oilfield to obtain valuable petroleum deposits from a geological formation. For example, the present carbon nanotube-infused fiber materials can be used to extract oil from formations where substantial water and/or sand is present or to extract heavier oils that would otherwise be difficult to isolate due to their high boiling points. In conjunction with a perforated piping system, for example, the wicking of such heavy oils by the present carbon nanotube-infused fiber materials overcoated on the perforated piping can be operatively coupled to a vacuum system, or the like, to continuously remove high boiling fractions from heavy oil and oil shale formations. Moreover, such processes can be used in conjunction with, or in lieu of, conventional thermal or catalyzed cracking methods that are known in the art.

The present carbon nanotube-infused fiber materials can also enhance structural elements in aerospace and ballistics applications. For example, structures including nose cones in missiles, leading edges of aircraft wings, primary aircraft structural parts (e.g., flaps, aerofoils, propellers and air brakes, small plane fuselages, helicopter shells and rotor blades), secondary aircraft structural parts (e.g., floors, doors, seats, air conditioners, and secondary tanks) and aircraft motor parts can benefit from the structural enhancement provided by the present carbon nanotube-infused fiber materials. Structural enhancement in many other applications can include, for example, mine sweeper hulls, helmets, radomes, rocket nozzles, rescue stretchers, and engine components. In building and construction, structural enhancement of exterior features includes, for example, columns, pediments, domes, cornices, and formwork. Likewise, interior building enhancement includes structures such as, for example, blinds, sanitary-ware, window profiles, and the like.

In the maritime industry, structural enhancement can include boat hulls, stringers, masts, propellers, rudders and decks. The present carbon nanotube-infused fiber materials can also be used in the heavy transportation industry in large panels for trailer walls, floor panels for railcars, truck cabs, exterior body molding, bus body shells, and cargo containers, for example. In automotive applications, carbon nanotube-infused fiber materials can be used in interior parts (e.g., trimming, seats, and instrument panels), exterior structures (e.g., body panels, openings, underbody, and front and rear modules), and automotive engine compartment and fuel mechanical area parts (e.g., axles and suspensions, fuel and exhaust systems, and electrical and electronic components).

Other applications of the present carbon nanotube-infused fiber materials can include, for example, bridge construction, reinforced concrete products (e.g., dowel bars, reinforcing bars, post-tensioning and pre-stressing tendons), stay-in-place framework, electric power transmission and distribution structures (e.g., utility poles, transmission poles, and cross-arms), highway safety and roadside features (e.g., sign supports, guardrails, posts and supports), noise barriers, municipal pipes and storage tanks.

The present carbon nanotube-infused fiber materials can also be used in a variety of leisure equipment such as, for example, water and snow skis, bicycles, kayaks, canoes and paddles, snowboards, golf club shafts, golf trolleys, fishing rods, and swimming pools. Other consumer goods and business equipment can include gears, pans, housings, gas pressure bottles and components for household appliances (e.g., washers, washing machine drums, dryers, waste disposal units, air conditioners and humidifiers).

The electrical properties of carbon nanotube-infused fiber materials also can impact various energy storage and electrical applications. For example, the present carbon nanotube-infused fiber materials can be used in wind turbine blades, solar structures, and electronic enclosures (e.g., laptops, cell phones, and computer cabinets, where the infused carbon nanotubes can be used to provide EMI shielding). Other applications can include power lines, cooling devices, light poles, circuit boards, electrical junction boxes, ladder rails, optical fiber, power built into structures such as data lines, computer terminal housings, and business equipment (e.g., copiers, cash registers and mailing equipment).

Embodiments disclosed herein utilize carbon nanotube-infused fiber materials that can be readily prepared by methods described in Applicants' U.S. patent application Ser. Nos. 12/611,073, 12/611,101, 12/611,103 and 12/938,328, each of which is incorporated by reference herein in its entirety. A brief description of the processes described therein follows.

To infuse carbon nanotubes to a fiber material, the carbon nanotubes are synthesized directly on the fiber material. In some embodiments, this is accomplished by first disposing a carbon nanotube-forming catalyst (e.g., catalytic nanoparticles) on the fiber material. A number of preparatory processes can be performed prior to this catalyst deposition.

In some embodiments, the fiber material can be optionally treated with plasma to prepare the fiber surface to accept the catalyst. For example, a plasma treated glass fiber material can provide a roughened glass fiber surface in which the carbon nanotube-forming catalyst can be deposited. In some embodiments, the plasma also serves to "clean" the fiber surface. The plasma process for "roughing" the fiber surface thus facilitates catalyst deposition. The roughness is typically on the scale of nanometers. In the plasma treatment process, craters or depressions are formed that are nanometers deep and nanometers in diameter. Such surface modification can be achieved using a plasma of any one or more of a variety of different gases, including, without limitation, argon, helium, oxygen, ammonia, nitrogen and hydrogen.

In some embodiments, where a fiber material being employed has a sizing agent associated with it, such sizing can be optionally removed prior to catalyst deposition. Optionally, the sizing agent can be removed after catalyst deposition. In some embodiments, sizing agent removal can be accomplished during carbon nanotube synthesis or just prior to carbon nanotube synthesis in a pre-heat step. In other embodiments, some sizing agents can remain throughout the entire carbon nanotube synthesis process.

Yet another optional step prior to or concomitant with the deposition of the carbon nanotube-forming catalyst (i.e., catalytic nanoparticles) is application of a barrier coating onto the fiber material. Barrier coatings are materials designed to protect the integrity of sensitive fiber materials, such as carbon fibers, organic fibers, glass fibers, metal fibers, and the like. Such a barrier coating can include, for example, an alkoxysilane, an alumoxane, alumina nanoparticles, spin on glass and glass nanoparticles. For example, in an embodiment the barrier coating can be Accuglass T-11 Spin-On Glass (Honeywell International Inc., Morristown, N.J.). The carbon nanotube-forming catalyst can be added to the uncured barrier coating material and then applied to the fiber material together, in one embodiment. In other embodiments, the barrier coating material can be added to the fiber material prior to deposition of the carbon nanotube-forming catalyst. In such embodiments, the barrier coating can be partially cured prior to catalyst deposition. The barrier coating material can be of a sufficiently thin thickness to allow exposure of the carbon nanotube-forming catalyst to the carbon feedstock gas for subsequent CVD or like carbon nanotube growth process. In some embodiments, the barrier coating thickness is less than or about equal to the effective diameter of the carbon nanotube-forming catalyst. Once the carbon nanotube-forming catalyst and the barrier coating are in place, the barrier coating can be fully cured. In some embodiments, the thickness of the barrier coating can be greater than the effective diameter of the carbon nanotube-forming catalyst so long as it still permits access of carbon feedstock gases to the sites of the catalyst. Such barrier coatings can be sufficiently porous to allow access of carbon feedstock gases to the carbon nanotube-forming catalyst.

Without being bound by theory, the barrier coating can serve as an intermediate layer between the fiber material and the carbon nanotubes and mechanically infuse the carbon nanotubes to the fiber material. Such mechanical infusion via a barrier coating provides a robust system for carbon nanotube growth in which the fiber material serves as a platform for organizing the carbon nanotubes, while still allowing the beneficial carbon nanotube properties to be conveyed to the fiber material. Benefits of mechanical infusion with a barrier coating are realized that are similar to the indirect type fusion described hereinabove. Moreover, the benefits of including a barrier coating include, for example, the immediate protection of the fiber material from chemical damage due to exposure to moisture and/or any thermal damage due to heating of the fiber material at the temperatures used to promote carbon nanotube growth.

As described further below, the carbon nanotube-forming catalyst can be prepared as a liquid solution that contains the carbon nanotube-forming catalyst as transition metal catalytic nanoparticles. The diameters of the synthesized carbon nanotubes are related to the size of the transition metal catalytic nanoparticles as described above.

Carbon nanotube synthesis can be based on a chemical vapor deposition (CVD) process or related carbon nanotube growth process which occurs at elevated temperatures. Other illustrative carbon nanotube growth processes include, for example, micro-cavity, laser ablation, flame synthesis, arc discharge, and high pressure carbon monoxide (HiPCO) synthesis. The specific temperature is a function of catalyst choice, but can typically be in a range of about 500° C. to about 1000° C. Accordingly, carbon nanotube synthesis involves heating the fiber material to a temperature in the aforementioned range to support carbon nanotube growth.

In some embodiments, CVD-promoted carbon nanotube growth on the catalyst-laden fiber material is then performed. The CVD process can be promoted by, for example, a carbon-containing feedstock gas such as acetylene, ethylene, and/or ethanol. The carbon nanotube growth processes also generally use an inert gas (nitrogen, argon, and/or helium) as a primary carrier gas. The carbon-containing feedstock gas is typically provided in a range from between about 0% to about 15% of the total mixture. A substantially inert environment for CVD growth can be prepared by removal of moisture and oxygen from the growth chamber.

In the carbon nanotube growth process, carbon nanotubes grow at the sites of transition metal catalytic nanoparticles that are operable for carbon nanotube growth. The presence of a strong plasma-creating electric field can be optionally employed to affect carbon nanotube growth. That is, the growth tends to follow the direction of the electric field. By properly adjusting the geometry of the plasma spray and electric field, vertically aligned carbon nanotubes (i.e., perpendicular to the longitudinal axis of the fiber material) can be synthesized. Under certain conditions, even in the absence of a plasma, closely-spaced carbon nanotubes can maintain a substantially vertical growth direction resulting in a dense array of carbon nanotubes resembling a carpet or forest.

Returning to the catalyst deposition process, a carbon nanotube-forming catalyst is deposited to provide a layer (typically no more than a monolayer) of catalytic nanoparticles on the fiber material for the purpose of growing carbon nanotubes thereon. The operation of depositing catalytic nanoparticles on the fiber material can be accomplished by a number of techniques including, for example, spraying or dip coating a solution of catalytic nanoparticles or by gas phase deposition, which can occur via, for example, a plasma process. Thus, in some embodiments, after forming a catalyst solution in a solvent, the catalyst can be applied by spraying or dip coating the fiber material with the solution, or combinations of spraying and dip coating. Either technique, used alone or in combination, can be employed once, twice, thrice, four times, up to any number of times to provide a fiber material that is sufficiently uniformly coated with catalytic nanoparticles that are operable for formation of carbon nanotubes. When dip coating is employed, for example, a fiber material can be placed in a first dip bath for a first residence time in the first dip bath. When employing a second dip bath, the fiber material can be placed in the second dip bath for a second residence time. For example, fiber materials can be subjected to a solution of carbon nanotube-forming catalyst for between about 3 seconds to about 90 seconds depending on the dip configuration and linespeed. Employing spraying or dip coating processes, a fiber material with a catalyst surface density of less than about 5% surface coverage to as high as about 80% surface coverage can be obtained. At higher surface densities (e.g., about 80%), the carbon nanotube-forming catalyst nanoparticles are nearly a monolayer. In some embodiments, the process of coating the carbon nanotube-forming catalyst on the fiber material produces no more than a monolayer. For example, carbon nanotube growth on a stack of carbon nanotube-forming catalyst can erode the degree of infusion of the carbon nanotubes to the fiber material. In other embodiments, transition metal catalytic nanoparticles can be deposited on the fiber material using evaporation techniques, electrolytic deposition techniques, and other processes known to those of ordinary skill in the art, such as addition of the transition metal catalyst to a plasma feedstock gas as a metal organic, metal salt or other composition promoting gas phase transport.

Because processes to manufacture carbon nanotube-infused fibers are designed to be continuous, a spoolable fiber material can be dip-coated in a series of baths where dip coating baths are spatially separated. In a continuous process in which nascent fibers are being generated de novo, such as newly formed glass fibers from a furnace, dip bath or spraying of a carbon nanotube-forming catalyst can be the first step after sufficiently cooling the newly formed fiber material. In some embodiments, cooling of newly formed glass fibers can be accomplished with a cooling jet of water which has the carbon nanotube-forming catalyst particles dispersed therein.

In some embodiments, application of a carbon nanotube-forming catalyst can be performed in lieu of application of a sizing when generating a fiber and infusing it with carbon nanotubes in a continuous process. In other embodiments, the carbon nanotube-forming catalyst can be applied to newly formed fiber materials in the presence of other sizing agents. Such simultaneous application of a carbon nanotube-forming catalyst and other sizing agents can provide the carbon nanotube-forming catalyst in surface contact with the fiber material to ensure carbon nanotube infusion. In yet further embodiments, the carbon nanotube-forming catalyst can be applied to nascent fibers by spray or dip coating while the fiber material is in a sufficiently softened state, for example, near or below the annealing temperature, such that the carbon nanotube-forming catalyst is slightly embedded in the surface of the fiber material. When depositing the carbon nanotube-forming catalyst on hot glass fiber materials, for example, care should be given to not exceed the melting point of the carbon nanotube-forming catalyst, thereby causing nanoparticle fusion and loss of control of the carbon nanotube characteristics (e.g., diameter) as a result.

The carbon nanotube-forming catalyst solution can be a transition metal nanoparticle solution of any d-block transition metal. In addition, the nanoparticles can include alloys and non-alloy mixtures of d-block metals in elemental form, in salt form, and mixtures thereof. Such salt forms include, without limitation, oxides, carbides, and nitrides, acetates, nitrates, and the like. Non-limiting illustrative transition metal nanoparticles include, for example, Ni, Fe, Co, Mo, Cu, Pt, Au, and μg, salts thereof and mixtures thereof. In some embodiments, such carbon nanotube-forming catalysts are disposed on the fiber material by applying or infusing a carbon nanotube-forming catalyst directly to the fiber material. Many nanoparticle transition metal catalysts are readily commercially available from a variety of suppliers, including, for example, Ferrotec Corporation (Bedford, N.H.).

Catalyst solutions used for applying the carbon nanotube-forming catalyst to the fiber material can be in any common solvent that allows the carbon nanotube-forming catalyst to be uniformly dispersed throughout. Such solvents can include, without limitation, water, acetone, hexane, isopropyl alcohol, toluene, ethanol, methanol, tetrahydrofuran (THF), cyclohexane or any other solvent with controlled polarity to create an appropriate dispersion of the carbon nanotube-forming catalytic nanoparticles therein. Concentrations of carbon nanotube-forming catalyst in the catalyst solution can be in a range from about 1:1 to about 1:10,000 catalyst to solvent.

In some embodiments, after applying the carbon nanotube-forming catalyst to the fiber material, the fiber material can be optionally heated to a softening temperature. This step can aid in embedding the carbon nanotube-forming catalyst in the surface of the fiber material to encourage seeded growth and prevent tip growth where the catalyst floats at the tip of the leading edge a growing carbon nanotube. In some embodiments heating of the fiber material after disposing the carbon nanotube-forming catalyst on the fiber material can be at a temperature between about 500° C. and about 1000° C. Heating to such temperatures, which can also be used for carbon nanotube growth, can serve to remove any pre-existing sizing agents on the fiber material allowing deposition of the carbon nanotube-forming catalyst directly on the fiber material. In some embodiments, the carbon nanotube-forming catalyst can also be placed on the surface of a sizing coating prior to heating. The heating step can be used to remove sizing agent while leaving the carbon nanotube-forming catalyst disposed on the surface of the fiber material. Heating at these temperatures can be performed prior to or substantially simultaneously with the introduction of a carbon-containing feedstock gas for carbon nanotube growth.

In some embodiments, the process of infusing carbon nanotubes to a fiber material includes removing sizing agents from the fiber material, applying a carbon nanotube-forming catalyst to the fiber material after sizing removal, heating the fiber material to at least about 500° C., and synthesizing carbon nanotubes on the fiber material. In some embodiments, operations of the carbon nanotube infusion process include removing sizing from a fiber material, applying a carbon nanotube-forming catalyst to the fiber material, heating the fiber material to a temperature operable for carbon nanotube synthesis and spraying a carbon plasma onto the catalyst-laden fiber material. Thus, where commercial fiber materials are employed, processes for constructing carbon nanotube-infused fibers can include a discrete step of removing sizing from the fiber material before disposing the catalytic nanoparticles on the fiber material. Some commercial sizing agents, if present, can prevent surface contact of the carbon nanotube-forming catalyst with the fiber material and inhibit carbon nanotube infusion to the fiber material. In some embodiments, where sizing removal is assured under carbon nanotube growth conditions, sizing removal can be performed after deposition of the carbon nanotube forming catalyst but just prior to or during providing a carbon-containing feedstock gas.

The step of synthesizing carbon nanotubes can include numerous techniques for forming carbon nanotubes, including, without limitation, micro-cavity, thermal or plasma-enhanced CVD techniques, laser ablation, arc discharge, flame synthesis and high pressure carbon monoxide (HiPCO). During CVD, in particular, a sized fiber material with carbon nanotube-forming catalyst disposed thereon, can be used directly. In some embodiments, any conventional sizing agents can be removed during carbon nanotube synthesis. In some embodiments other sizing agents are not removed, but do not hinder carbon nanotube synthesis and infusion to the fiber material due to the diffusion of the carbon-containing feedstock gas through the sizing. In some embodiments, acetylene gas can be ionized to create a jet of cold carbon plasma for carbon nanotube growth. The plasma is directed toward the catalyst-laden fiber material. Thus, in some embodiments synthesizing carbon nanotubes on a fiber material includes (a) forming a carbon plasma; and (b) directing the carbon plasma onto the catalyst disposed on the fiber material. The diameters of the carbon nanotubes that are grown are dictated by the size of the carbon nanotube-forming catalyst. In some embodiments, a sized fiber material can be heated to between about 550° C. and about 800° C. to facilitate carbon nanotube synthesis. To initiate the growth of carbon nanotubes, two or more gases are bled into the reactor: an inert carrier gas (e.g., argon, helium, or nitrogen) and a carbon-containing feedstock gas (e.g., acetylene, ethylene, ethanol or methane). Carbon nanotubes grow at the sites of the carbon nanotube-forming catalyst.

In some embodiments, a CVD growth process can be plasma-enhanced. A plasma can be generated by providing an electric field during the growth process. Carbon nanotubes grown under these conditions can follow the direction of the electric field. Thus, by adjusting the geometry of the reactor, vertically aligned carbon nanotubes can be grown where the carbon nanotubes are substantially perpendicular to the longitudinal axis of the fiber material (i.e., radial growth). In some embodiments, a plasma is not required for radial growth to occur about the fiber material. For fiber materials that have distinct sides such as, for example, tapes, mats, fabrics, plies, and the like, the carbon nanotube-forming catalyst can be disposed on one or both sides of the fiber material. Correspondingly, under such conditions, carbon nanotubes can be grown on one or both sides of the fiber material as well.

As described above, the carbon nanotube synthesis is performed at a rate sufficient to provide a continuous process for infusing spoolable length fiber materials with carbon nanotubes. Numerous apparatus configurations facilitate such a continuous synthesis as exemplified below.

In some embodiments, carbon nanotube-infused fiber materials can be prepared in an "all-plasma" process. In such embodiments, the fiber materials pass through numerous plasma-mediated steps to form the final carbon nanotube-infused fiber materials. The first of the plasma processes, can include a step of fiber surface modification. This is a plasma process for "roughing" the surface of the fiber material to facilitate catalyst deposition, as described above. As also described above, surface modification can be achieved using a plasma of any one or more of a variety of different gases, including, without limitation, argon, helium, oxygen, ammonia, hydrogen, and nitrogen.

After surface modification, the fiber material proceeds to catalyst application. In the present all-plasma process, this step is a plasma process for depositing the carbon nanotube-forming catalyst on the fiber material. The carbon nanotube-forming catalyst is typically a transition metal as described above. The transition metal catalyst can be added to a plasma feedstock gas as a precursor in non-limiting forms including, for example, a ferrofluid, a metal organic, a metal salt, mixtures thereof or any other composition suitable for promoting gas phase transport. The carbon nanotube-forming catalyst can be applied at room temperature in ambient environment with neither vacuum nor an inert atmosphere being required. In some embodiments, the fiber material can be cooled prior to catalyst application.

Continuing the all-plasma process, carbon nanotube synthesis occurs in a carbon nanotube-growth reactor. Carbon nanotube growth can be achieved through the use of plasma-enhanced chemical vapor deposition, wherein carbon plasma is sprayed onto the catalyst-laden fibers. Since carbon nanotube growth occurs at elevated temperatures (typically in a range of about 500° C. to about 1000° C. depending on the catalyst), the catalyst-laden fibers can be heated prior to being exposed to the carbon plasma. For the carbon nanotube infusion process, the fiber material can be optionally heated until softening occurs. After heating, the fiber material is ready to receive the carbon plasma. The carbon plasma can be generated, for example, by passing a carbon-containing feedstock gas such as, for example, acetylene, ethylene, ethanol, and the like, through an electric field that is capable of ionizing the gas. This cold carbon plasma is directed, via spray nozzles, to the fiber material. The fiber material can be in close proximity to the spray nozzles, such as within about 1 centimeter of the spray nozzles, to receive the plasma. In some embodiments, heaters can be disposed above the fiber material at the plasma sprayers to maintain the elevated temperature of the fiber material.

Another configuration for continuous carbon nanotube synthesis involves a special rectangular reactor for the synthesis and growth of carbon nanotubes directly on fiber materials. The reactor can be designed for use in a continuous in-line process for producing carbon nanotube-infused fiber materials. In some embodiments, carbon nanotubes are grown via a CVD process at atmospheric pressure and an elevated temperature in the range of about 550° C. and about 800° C. in a multi-zone reactor. The fact that the carbon nanotube synthesis occurs at atmospheric pressure is one factor that facilitates the incorporation of the reactor into a continuous processing line for carbon nanotube infusion to the fiber materials. Another advantage consistent with in-line continuous processing using such a zone reactor is that carbon nanotube growth occurs in seconds, as opposed to minutes (or longer), as in other procedures and apparatus configurations typical in the art.

Carbon nanotube synthesis reactors in accordance with the various embodiments include the following features:

Rectangular Configured Synthesis Reactors: The cross-section of a typical carbon nanotube synthesis reactor known in the art is circular. There are a number of reasons for this including, for example, historical reasons (e.g., cylindrical reactors are often used in laboratories) and convenience (e.g., flow dynamics are easy to model in cylindrical reactors, heater systems readily accept circular tubes (e.g., quartz, etc.), and ease of manufacturing. Departing from the cylindrical convention, the present disclosure provides a carbon nanotube synthesis reactor having a rectangular cross section. The reasons for the departure include at least the following:

1) Inefficient Use of Reactor Volume. Since many fiber materials that can be processed by the reactor are relatively planar (e.g., flat tapes, sheet-like forms, or spread tows or rovings), a circular cross-section is an inefficient use of the reactor volume. This inefficiency results in several drawbacks for cylindrical carbon nanotube synthesis reactors including, for example, a) maintaining a sufficient system purge; increased reactor volume requires increased gas flow rates to maintain the same level of gas purge, resulting in inefficiencies for high volume production of carbon nanotubes in an open environment; b) increased carbon-containing feedstock gas flow rates; the relative increase in inert gas flow for system purge, as per a) above, requires increased carbon-containing feedstock gas flow rates. Consider that the volume of an illustrative 12K glass fiber roving is approximately 2000 times less than the total volume of a synthesis reactor having a rectangular cross-section. In an equivalent cylindrical reactor (i.e., a cylindrical reactor that has a width that accommodates the same planarized glass fiber material as the rectangular cross-section reactor), the volume of the glass fiber material is approximately 17,500 times less than the volume of the reactor. Although gas deposition processes, such as CVD, are typically governed by pressure and temperature alone, volume can have a significant impact on the efficiency of deposition. With a rectangular reactor there is a still excess volume, and this excess volume facilitates unwanted reactions. However, a cylindrical reactor has about eight times that volume available for facilitating unwanted reactions. Due to this greater opportunity for competing reactions to occur, the desired reactions effectively occur more slowly in a cylindrical reactor. Such a slow down in carbon nanotube growth, is problematic for the development of continuous growth processes. Another benefit of a rectangular reactor configuration is that the reactor volume can be decreased further still by using a small height for the rectangular chamber to make the volume ratio better and the reactions even more efficient. In some embodiments disclosed herein, the total volume of a rectangular synthesis reactor is no more than about 3000 times greater than the total volume of a fiber material being passed through the synthesis reactor. In some further embodiments, the total volume of the rectangular synthesis reactor is no more than about 4000 times greater than the total volume of the fiber material being passed through the synthesis reactor. In some still further embodiments, the total volume of the rectangular synthesis reactor is less than about 10,000 times greater than the total volume of the fiber material being passed through the synthesis reactor. Additionally, it is notable that when using a cylindrical reactor, more carbon-containing feedstock gas is required to provide the same flow percent as compared to reactors having a rectangular cross section. It should be appreciated that in some other embodiments, the synthesis reactor has a cross-section that is described by polygonal forms that are not rectangular, but are relatively similar thereto and provide a similar reduction in reactor volume relative to a reactor having a circular cross section; and c) problematic temperature distribution; when a relatively small-diameter reactor is used, the temperature gradient from the center of the chamber to the walls thereof is minimal, but with increased reactor size, such as would be used for commercial-scale production, such temperature gradients increase. Temperature gradients result in product quality variations across the fiber material (i.e., product quality varies as a function of radial position). This problem is substantially avoided when using a reactor having a rectangular cross-section. In particular, when a planar substrate is used, reactor height can be maintained constant as the size of the substrate scales upward. Temperature gradients between the top and bottom of the reactor are essentially negligible and, as a consequence, thermal issues and the product-quality variations that result are avoided.

2) Gas introduction. Because tubular furnaces are normally employed in the art, typical carbon nanotube synthesis reactors introduce gas at one end and draw it through the reactor to the other end. In some embodiments disclosed herein, gas can be introduced at the center of the reactor or within a target growth zone, symmetrically, either through the sides or through the top and bottom plates of the reactor. This improves the overall carbon nanotube growth rate because the incoming feedstock gas is continuously replenishing at the hottest portion of the system, which is where carbon nanotube growth is most active.

Zoning. Chambers that provide a relatively cool purge zone extend from both ends of the rectangular synthesis reactor. Applicants have determined that if a hot gas were to mix with the external environment (i.e., outside of the rectangular reactor), there would be increased degradation of the fiber material. The cool purge zones provide a buffer between the internal system and external environments. Carbon nanotube synthesis reactor configurations known in the art typically require that the substrate is carefully (and slowly) cooled. The cool purge zone at the exit of the present rectangular carbon nanotube growth reactor achieves the cooling in a short period of time, as required for continuous in-line processing.

Non-contact, hot-walled, metallic reactor. In some embodiments, a metallic hot-walled reactor (e.g., stainless steel) is employed. Use of this type of reactor can appear counterintuitive because metal, and stainless steel in particular, is more susceptible to carbon deposition (i.e., soot and by-product formation). Thus, most carbon nanotube synthesis reactors are made from quartz because there is less carbon deposited, quartz is easier to clean, and quartz facilitates sample observation. However, Applicants have observed that the increased soot and carbon deposition on stainless steel results in more consistent, efficient, faster, and stable carbon nanotube growth. Without being bound by theory it has been indicated that, in conjunction with atmospheric operation, the CVD process occurring in the reactor is diffusion limited. That is, the carbon nanotube-forming catalyst is "overfed;" too much carbon is available in the reactor system due to its relatively higher partial pressure (than if the reactor was operating under partial vacuum). As a consequence, in an open system—especially a clean one—too much carbon can adhere to the particles of carbon nanotube-forming catalyst, compromising their ability to synthesize carbon nanotubes. In some embodiments, the rectangular reactor is intentionally run when the reactor is "dirty," that is with soot deposited on the metallic reactor walls. Once carbon deposits to a monolayer on the walls of the reactor, carbon will readily deposit over itself. Since some of the available carbon is "withdrawn" due to this mechanism, the remaining carbon feedstock, in the form of radicals, reacts with the carbon nanotube-forming catalyst at a rate that does not poison the catalyst. Existing systems run "cleanly" which, if they were open for continuous processing, would produce a much lower yield of carbon nanotubes at reduced growth rates.

Although it is generally beneficial to perform carbon nanotube synthesis "dirty" as described above, certain portions of the apparatus (e.g., gas manifolds and inlets) can nonetheless negatively impact the carbon nanotube growth process when soot creates blockages. In order to combat this problem, such areas of the carbon nanotube growth reaction chamber can be protected with soot inhibiting coatings such as, for example, silica, alumina, or MgO. In practice, these portions of the apparatus can be dip-coated in these soot inhibiting coatings. Metals such as INVAR® can be used with these coatings as INVAR has a similar CTE (coefficient of thermal expansion) ensuring proper adhesion of the coating at higher temperatures, preventing the soot from significantly building up in critical zones.

Combined Catalyst Reduction and Carbon Nanotube Synthesis. In the carbon nanotube synthesis reactor disclosed herein, both catalyst reduction and carbon nanotube growth occur within the reactor. This is significant because the reduction step cannot be accomplished timely enough for use in a continuous process if performed as a discrete operation. In a typical process known in the art, a reduction step typically takes 1-12 hours to perform. Both operations occur in a reactor in accordance with the present disclosure due, at least in part, to the fact that carbon-containing feedstock gas is introduced at the center of the reactor, not the end as would be typical in the art using cylindrical reactors. The reduction process occurs as the fiber material enters the heated zone. By this point, the gas has had time to react with the walls and cool off prior to reducing the catalyst (via hydrogen radical interactions). It is this transition region where the reduction occurs. At the hottest isothermal zone in the system, carbon nanotube growth occurs, with the greatest growth rate occurring proximal to the gas inlets near the center of the reactor.

In some embodiments, when loosely affiliated fiber materials including, for example, tows or rovings are employed (e.g., a glass roving), the continuous process can include steps that spread out the strands and/or filaments of the tow or roving. Thus, as a tow or roving is unspooled it can be spread using a vacuum-based fiber spreading system, for example. When employing sized glass fiber rovings, for example, which can be relatively stiff, additional heating can be employed in order to "soften" the roving to facilitate fiber spreading. The spread fibers which contain individual filaments can be spread apart sufficiently to expose an entire surface area of the filaments, thus allowing the roving to more efficiently react in subsequent process steps. For example, a spread tow or roving can pass through a surface treatment step that is composed of a plasma system as described above. The roughened, spread fibers then can pass through a carbon nanotube-forming catalyst dip bath. The result is fibers of the glass roving that have catalyst particles distributed radially on their surface. The catalyzed-laden fibers of the roving then enter an appropriate carbon nanotube growth chamber, such as the rectangular chamber described above, where a flow through atmospheric pressure CVD or plasma enhanced-CVD process is used to synthesize carbon nanotubes at rates as high as several microns per second. The fibers of the roving, now having radially aligned carbon nanotubes thereon, exit the carbon nanotube growth reactor.

Following the synthesis of carbon nanotube-infused fiber materials as described in the processes outlined above, the carbon nanotubes infused thereon can then be reoriented in a substantially parallel manner and crosslinked. Additional carbon nanotubes can then be grown on the substantially parallel-aligned, infused carbon nanotubes, and the additional carbon nanotubes can likewise be reoriented in a substantially parallel manner and crosslinked. In various embodiments, the operations of reorienting and crosslinking the infused carbon nanotubes and growing, reorienting and crosslinking the additional carbon nanotubes can be operatively coupled to the initial carbon nanotube infusion process. Such a process is outlined in FIG. 5.

Figure 5:
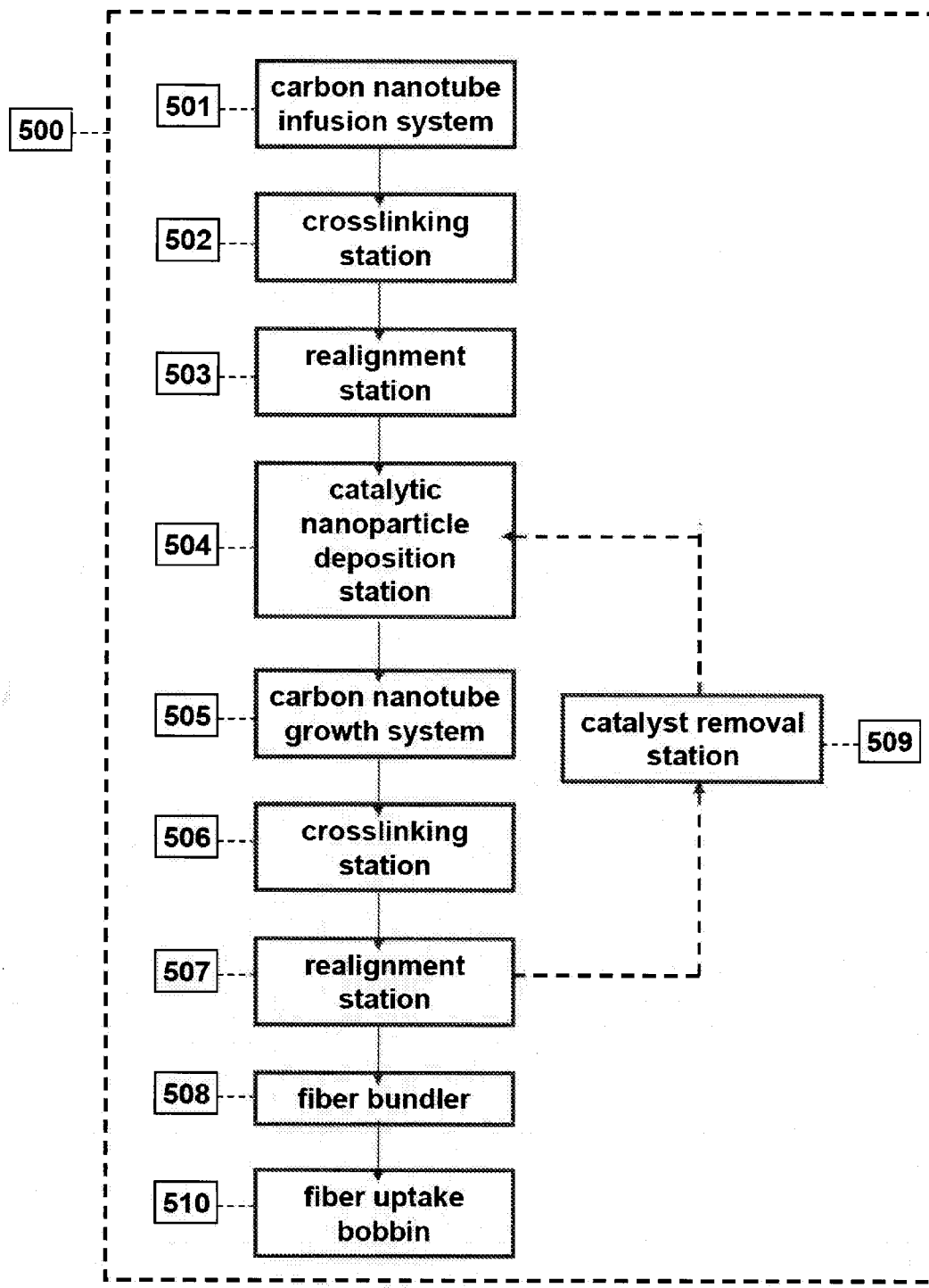
FIG. 5 shows a schematic of an illustrative continuous system for synthesizing carbon nanotube-infused fiber materials having substantially parallel-aligned, infused carbon nanotubes.

FIG. 5 shows a schematic of an illustrative continuous system 500 for synthesizing carbon nanotube-infused fiber materials having substantially parallel-aligned, infused carbon nanotubes. Continuous system 500 includes an initial carbon nanotube infusion station 501 that operates in accordance with any of the various embodiments described hereinabove to infuse a fiber material with carbon nanotubes. Upon exiting carbon nanotube infusion station 501, the fiber material enters crosslinking station 502 to form crosslinks with at least a portion of the infused carbon nanotubes. In various embodiments, crosslinking station 502 can be a bath containing a crosslinking agent (e.g., a crosslinking polymer) such as those described hereinabove. Next, the fiber material enters realignment station 503 in which the crosslinked carbon nanotubes are realigned such that they form a layer of infused carbon nanotubes that are aligned substantially parallel to the longitudinal axis of the fiber material. In practice, some degree of alignment can also occur at crosslinking station 502 if a solvent is used that exerts a drawing force on the fiber material. Further, to achieve a desired degree of alignment, continuous system 500 can optionally contain multiple crosslinking stations 502 and/or realignment stations 503. For example, continuous system 500 can optionally contain two or more realignment stations 503 to achieve a desired degree of carbon nanotube alignment. Different realignment procedures can be employed when two or more realignment stations 503 are used.

After forming a fiber material that has a layer of substantially parallel-aligned, infused carbon nanotubes thereon, the fiber material passes into catalytic nanoparticle deposition station 504. Deposition of catalytic nanoparticles can take place as described hereinabove to deposit catalytic nanoparticles on the layer of substantially parallel-aligned, infused carbon nanotubes. Upon exiting catalytic nanoparticle deposition station 504, the fiber material enters carbon nanotube growth system 505. Carbon nanotube growth system 505 operates in substantially the same manner as carbon nanotube infusion system 501, with the exception that the carbon nanotubes are grown on the layer of substantially parallel-aligned, infused carbon nanotubes rather than directly on the barrier coating or fiber material. After growing carbon nanotubes in carbon nanotube growth system 505, the fiber material passes through crosslinking station 506 and realignment station 507, where these stations operate similarly to previously described stations 502 and 503.

After exiting realignment station 507, continuous system 500 can be used to grow still additional carbon nanotubes on the fiber material. To this end, the fiber material can again be passed through catalytic nanoparticle deposition station 504, carbon nanotube growth system 505, crosslinking station 506 and realignment station 507. These elements can be duplicated in series in continuous system 500, or continuous system 500 can optionally route the fiber material through these elements multiple times. The catalytic nanoparticles can be removed from the fiber material before growing additional carbon nanotubes thereon by passing the fiber material through optional catalyst removal station 509. In an embodiment, catalyst removal station 509 can employ one or more acid baths suitable for removing the catalytic nanoparticles.

Once a desired amount of additional carbon nanotubes have been grown on the fiber material, the fiber material is wound onto a spool, mandrel or like winder in fiber uptake bobbin 510. When multiple fibers are having carbon nanotubes grown thereon in continuous system 500, the system can further include optional fiber bundler 508, which winds the individual filaments into higher order fiber materials, such as those described above.

It is understood that modifications which do not substantially affect the activity of the various embodiments of this invention are also included within the definition of the invention provided herein. Accordingly, the following Examples are intended to illustrate but not limit the present invention.

EXAMPLE 1

Continuous process for infusing carbon nanotubes to a carbon fiber material, followed by realignment and crosslinking thereof. In this example, 34-700 12K unsized carbon fiber tow with a tex value of 793 (Grafil Inc., Sacramento, Calif.) was used as the fiber material for carbon nanotube infusion. The individual filaments in this carbon fiber tow have a diameter of approximately 7 µm. Carbon nanotube infusion, realignment and crosslinking were conducted using a continuous system similar to that depicted in FIG. 5 above. In the present Example, one layer of carbon nanotubes was grown on the carbon fibers.

As depicted in FIG. 5, carbon nanotube infusion system 501 was used to infuse carbon nanotubes to the carbon fiber substrate. Prior to entering carbon nanotube infusion system 501, catalytic nanoparticles and barrier coatings were applied in a reverse order. That is, after the fiber material was sufficiently spread in a spreader station (not shown), the catalytic nanoparticles were coated onto the fiber material via multiple dip baths where a solution of 'EFH-1' (Ferrotec Corporation, Bedford, N.H.) diluted in hexane by a dilution rate of 3000 to 1 by volume was used. The fiber material was dried thereafter. Next, a barrier coating of 'Accuglass T-11 Spin-On Glass' (Honeywell International Inc., Morristown, N.J.) diluted in isopropyl alcohol at a dilution rate of 40 to 1 by volume was applied via a dip bath. Drying in a bake oven was conducted thereafter. Carbon nanotube growth by atmospheric pressure CVD was conducted in a rectangular reactor, such as that described herein, having a 24 inch growth zone. 98.0% of the total gas flow was inert gas (nitrogen) and the other 2.0% was the carbon feedstock (acetylene). The carbon fiber tow was drawn through the reactor at a rate of 1.5 feet/min, where the growth zone was held at 700° C. The resulting infused carbon nanotubes were ~10 μM in length.

The carbon nanotube-infused carbon fiber tow was then pulled through crosslinking station 502, which consisted of a dip bath containing KENTERA (Zyvex Performance Materials, Columbus, Ohio) diluted in water by a dilution rate of 100 parts water to 1 to part KENTERA by volume. Crosslinked carbon nanotubes infused to the carbon fibers were obtained.

The crosslinked carbon nanotube-infused carbon fiber tow was then passed through realignment station 503, where a parallel alignment of the carbon nanotubes in the direction of the fiber axis was introduced via mechanical realignment instituted from by tapered die. Ultimately, the realignment mechanism also involved both a chemical and mechanical process, since excess solution from the crosslinking station was also forced out of the fiber material upon passing through the die. The shearing force of this action also contributed to the realignment.

Since only one layer of carbon nanotubes was grown in the present Example, deposition of additional catalytic nanoparticles and growth of additional carbon nanotubes was omitted. Thus, in this Example the aligned, crosslinked carbon nanotube-infused carbon fiber tow was then passed through fiber bundler 508 to recombine the individual filaments into a tow of smaller size, which was subsequently wound on a spool using fiber uptake bobbin 510.

Figure 6A:
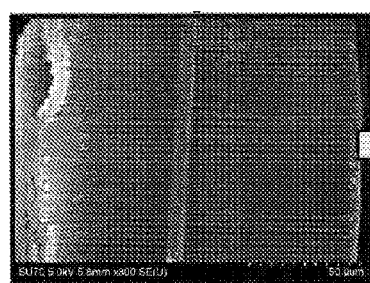
FIGS. 6A-6D show a series of representative SEM images illustrating substantially perpendicular-aligned carbon nanotubes, as grown, on the surface of a fiber material (FIG. 6A) and substantially parallel-aligned carbon nanotubes on the surface of the fiber material following realignment of the substantially perpendicular-aligned carbon nanotubes (FIGS. 6B-6D).
Figure 6B:
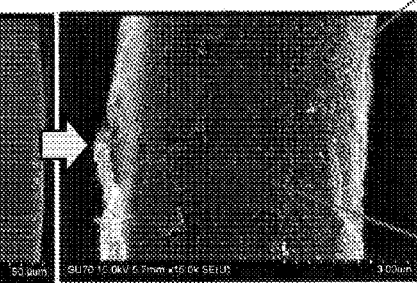
Figure 6C:
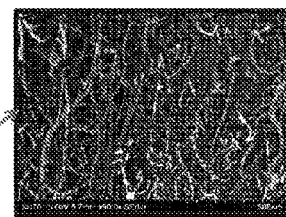
Figure 6D:
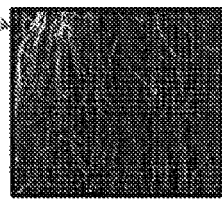

FIGS. 6A-6D show a series of representative SEM images illustrating substantially perpendicular-aligned carbon nanotubes, as grown, on the surface of a carbon fiber material (FIG. 6A) and substantially parallel-aligned carbon nanotubes on the surface of the carbon fiber material following realignment of the substantially perpendicular-aligned carbon nanotubes (FIGS. 6B-6D). FIGS. 6C and 6D show high resolution images of the substantially parallel-aligned, infused carbon nanotubes. The carbon nanotube-infused carbon fibers prepared in the accordance with this Example demonstrated a tensile strength improvement of ~45% relative to the untreated fiber material.

Although the invention has been described with reference to the disclosed embodiments, those of ordinary skill in the art will readily appreciate that these are only illustrative of the invention. It should be understood that various modifications can be made without departing from the spirit of the invention.

What is claimed is:

1. A method comprising:
   providing a carbon nanotube-infused fiber material comprising a fiber material and carbon nanotubes infused to the fiber material, the carbon nanotubes being aligned substantially perpendicular to the outer surface of the fiber material, and the carbon nanotubes being grown on the fiber material and infused to the outer surface;
   crosslinking at least a portion of the substantially perpendicular-aligned, infused carbon nanotubes to each other, to the fiber material, or to both; and
   after crosslinking, drawing the carbon nanotube-infused fiber material from a liquid to reorient at least some of the carbon nanotubes into a substantially parallel orientation with respect to the longitudinal axis of the fiber material and to form a layer of crosslinked, infused carbon nanotubes on the outer surface of the fiber material.

2. The method of claim 1, wherein crosslinking comprises covalent bonding.

3. The method of claim 1, wherein crosslinking comprises pi-stacking interactions.

4. The method of claim 3, wherein a crosslinking polymer forms the pi-stacking interactions with the substantially perpendicular-aligned, infused carbon nanotubes.

5. The method of claim 4, further comprising:
   placing the carbon nanotube-infused fiber material in a matrix material.

6. The method of claim 1, further comprising:
   after drawing the carbon nanotube-infused fiber material from a liquid, reorienting at least a portion of the carbon nanotubes into a substantially parallel orientation by a mechanical process.

7. The method of claim 6, wherein the mechanical process comprises passing the carbon nanotube-infused fiber material through a die.

8. The method of claim 1, further comprising:
   depositing catalytic nanoparticles on the layer of substantially parallel-aligned, infused carbon nanotubes;
   growing additional carbon nanotubes on the layer of substantially parallel-aligned, infused carbon nanotubes; and
   orienting the additional carbon nanotubes such that they are aligned substantially parallel to the longitudinal axis of the fiber material.

9. The method of claim 8, further comprising:
   crosslinking at least a portion of the additional carbon nanotubes to at least a portion of the substantially parallel-aligned, infused carbon nanotubes, to each other, or to both.

10. The method of claim 9, further comprising:
    placing the carbon nanotube-infused fiber material in a matrix material.

11. The method of claim 1, wherein the fiber material is of a continuous length.

12. A method comprising:
    providing a carbon nanotube-infused fiber material comprising a fiber material and carbon nanotubes infused to the fiber material, the carbon nanotubes being aligned substantially perpendicular to the outer surface of the fiber material, and the carbon nanotubes being grown on the fiber material and infused to the outer surface;
    adding a crosslinking polymer to the carbon nanotube-infused fiber material to form crosslinked, substantially perpendicular-aligned, infused carbon nanotubes;
    wherein the crosslinking polymer forms pi-stacking interactions with the crosslinked, substantially perpendicular-aligned, infused carbon nanotubes; and
    reorienting at least a portion of the crosslinked, substantially perpendicular-aligned, infused carbon nanotubes into a substantially parallel orientation with respect to the longitudinal axis of the fiber material by drawing the carbon nanotube-infused fiber material from a liquid to form a layer of crosslinked, infused carbon nanotubes on the outer surface of the fiber material.

13. The method of claim 12, further comprising:
after drawing the carbon nanotube-infused fiber material from a liquid, reorienting at least a portion of the carbon nanotubes into a substantially parallel orientation by a mechanical process.

14. The method of claim 13, wherein the mechanical process comprises passing the carbon nanotube-infused fiber material through a die.

15. The method of claim 12, further comprising:
depositing catalytic nanoparticles on the layer of crosslinked, substantially parallel-aligned, infused carbon nanotubes;
growing additional carbon nanotubes on the layer of crosslinked, substantially parallel-aligned, infused carbon nanotubes; and
orienting the additional carbon nanotubes such that they are aligned substantially parallel to the longitudinal axis of the fiber material.

16. The method of claim 15, further comprising:
crosslinking at least a portion of the additional carbon nanotubes to at least a portion of the crosslinked, substantially parallel-aligned, infused carbon nanotubes, to each other, or to both.

17. A continuous carbon nanotube growth process, the process comprising:
providing a continuous fiber material;
growing carbon nanotubes on the outer surface of the continuous fiber material in a continuous carbon nanotube growth process;
wherein the carbon nanotubes are infused to the fiber material on the outer surface to form a carbon nanotube-infused fiber material, and the carbon nanotubes are aligned substantially perpendicular to the outer surface of the fiber material;
crosslinking at least a portion of the infused carbon nanotubes to each other, to the fiber material, or both;
wherein crosslinking comprises treating the infused carbon nanotubes with a crosslinking polymer that forms pi-stacking interactions with the infused carbon nanotubes to form crosslinked, infused carbon nanotubes; and
after crosslinking, drawing the carbon nanotube-infused fiber material from a liquid to reorient at least some of the carbon nanotubes into a substantially parallel orientation with respect to the longitudinal axis of the fiber material and to form a layer of crosslinked, infused carbon nanotubes on the outer surface of the fiber material.

18. The continuous carbon nanotube growth process of claim 17, further comprising:
depositing catalytic nanoparticles on the layer of crosslinked, substantially parallel-aligned, infused carbon nanotubes;
growing additional carbon nanotubes on the layer of crosslinked, substantially parallel-aligned, infused carbon nanotubes; and
orienting the additional carbon nanotubes such that they are aligned substantially parallel to the longitudinal axis of the fiber material.

19. The continuous carbon nanotube growth process of claim 18, further comprising:
crosslinking at least a portion of the additional carbon nanotubes to at least a portion of the crosslinked, substantially parallel-aligned, infused carbon nanotubes, to each other, or to both.

* * * * *